United States Patent [19]
Wilkins et al.

[11] Patent Number: 5,825,961
[45] Date of Patent: *Oct. 20, 1998

[54] FIBER OPTIC CLOSURE WITH CABLE ADAPTER SPOOL

[75] Inventors: Timothy A. Wilkins; Donald J. Smith, both of Burbank, Calif.

[73] Assignee: PSI Telecommunications, Inc., Burbank, Calif.

[ * ] Notice: The term of this patent shall not extend beyond the expiration date of Pat. No. 5,568,584.

[21] Appl. No.: 740,608

[22] Filed: Oct. 31, 1996

Related U.S. Application Data

[60] Division of Ser. No. 536,567, Sep. 29, 1995, abandoned, which is a continuation-in-part of Ser. No. 407,210, Mar. 20, 1995, Pat. No. 5,568,584.

[51] Int. Cl.⁶ ........................................ G02B 6/00
[52] U.S. Cl. ............................ 385/135; 385/137
[58] Field of Search ............................ 385/134–137; 174/72 R, 77 R, 93, 92

[56] References Cited

U.S. PATENT DOCUMENTS

| | | | |
|---|---|---|---|
| 3,760,811 | 9/1973 | Andrew | 128/207.17 |
| 3,856,246 | 12/1974 | Sinko | 248/68.1 |
| 3,924,055 | 12/1975 | Moore et al. | 124/70 R |
| 4,108,534 | 8/1978 | LeNoane et al. | 385/134 |
| 4,118,838 | 10/1978 | Schiefer et al. | 24/115 R |
| 4,239,335 | 12/1980 | Stiles | 385/106 |
| 4,266,853 | 5/1981 | Hutchins et al. | 385/135 |
| 4,359,262 | 11/1982 | Dolan | 385/135 |
| 4,373,776 | 2/1983 | Purdy | 385/135 |
| 4,395,089 | 7/1983 | McKee | 385/136 |
| 4,445,750 | 5/1984 | Grois et al. | 385/69 |
| 4,447,120 | 5/1984 | Borsuk | 385/136 |
| 4,538,021 | 8/1985 | Williamson, Jr. | 174/92 |
| 4,548,465 | 10/1985 | White | 385/138 |
| 4,627,686 | 12/1986 | Szentesi | 385/135 |
| 4,679,896 | 7/1987 | Krafcik et al. | 385/135 |
| 4,684,196 | 8/1987 | Smith et al. | 439/411 |
| 4,687,289 | 8/1987 | DeSanti | 385/135 |
| 4,744,627 | 5/1988 | Chande et al. | 385/137 |
| 4,754,876 | 7/1988 | Noon et al. | 385/135 |
| 4,761,052 | 8/1988 | Buekers et al. | 385/135 |
| 4,799,757 | 1/1989 | Goetter | 385/135 |
| 4,805,979 | 2/1989 | Bossard et al. | 385/135 |
| 4,902,855 | 2/1990 | Smith | 174/77 R |

(List continued on next page.)

FOREIGN PATENT DOCUMENTS

| | | |
|---|---|---|
| 0 077 115 | 4/1983 | European Pat. Off. . |
| 0 043 570 | 4/1984 | European Pat. Off. . |
| 0 159 857 | 10/1985 | European Pat. Off. . |
| 0 213 365 | 3/1987 | European Pat. Off. . |
| 30 06 131 | 9/1981 | Germany . |
| 37 06 518 | 9/1988 | Germany . |
| 52-13346 | 2/1977 | Japan . |
| 55-100504 | 7/1980 | Japan . |
| 55-127507 | 10/1980 | Japan . |
| 55-127508 | 10/1980 | Japan . |
| 2 124 439 | 2/1984 | United Kingdom . |
| 2 176 024 | 12/1986 | United Kingdom . |
| 2 254 163 | 4/1994 | United Kingdom . |

OTHER PUBLICATIONS

P.S.I. Lightlinker™Series Fiber Optic Splice Closures, A System of Closures for all Fiber Applications, Aug. 1993.

*Primary Examiner*—Hemang Sanghavi
*Attorney, Agent, or Firm*—Graham & James LLP

[57] ABSTRACT

A fiber optic splice closure assembly has two end plate assemblies, and a closure base and a closure cover attached to the end plate assemblies. An adapter is secured within a cable entrance port in the end plate assembly to alter the end plate opening to accommodate a fiber optic cable. The adapter restrains the cable sheath against axial forces and provides a seal between the optical fiber cable, the adapter and the end plate assembly. A bracket assembly is provided to anchor the optical fiber cable strength member to the end plate assembly. The closure provides a mounting bar secured to said end plate assemblies proximate the closure base and a mounting platform secured to the mounting bar.

13 Claims, 12 Drawing Sheets

U.S. PATENT DOCUMENTS

| | | | |
|---|---|---|---|
| 4,913,522 | 4/1990 | Nolf et al. | 385/95 |
| 4,927,227 | 5/1990 | Bensel, III et al. | 385/135 |
| 4,963,700 | 10/1990 | Olsen et al. | 174/138 F |
| 4,988,834 | 1/1991 | Birch | 174/93 |
| 4,991,928 | 2/1991 | Zimmer | 385/137 |
| 5,007,701 | 4/1991 | Roberts | 385/53 |
| 5,042,901 | 8/1991 | Merriken et al. | 385/135 |
| 5,059,748 | 10/1991 | Allen et al. | 174/87 |
| 5,074,635 | 12/1991 | Justice et al. | 385/95 |
| 5,097,529 | 3/1992 | Cobb et al. | 385/135 |
| 5,133,039 | 7/1992 | Dixit | 385/135 |
| 5,136,121 | 8/1992 | Kluska et al. | 174/93 |
| 5,151,964 | 9/1992 | Carpenter et al. | 385/98 |
| 5,155,303 | 10/1992 | Bense, III et al. | 174/93 |
| 5,155,781 | 10/1992 | Doss et al. | 385/71 |
| 5,155,787 | 10/1992 | Carpenter et al. | 385/98 |
| 5,155,794 | 10/1992 | Nolf et al. | 385/135 |
| 5,189,725 | 2/1993 | Bensel, III et al. | 385/135 |
| 5,199,099 | 3/1993 | Dalgoutte | 385/135 |
| 5,222,183 | 6/1993 | Daems et al. | 385/135 |
| 5,224,199 | 6/1993 | Cortijo | 385/135 |
| 5,237,635 | 8/1993 | Lai | 385/101 |
| 5,245,151 | 9/1993 | Chamberlain et al. | 219/759 |
| 5,249,253 | 9/1993 | Franckx et al. | 385/135 |
| 5,255,337 | 10/1993 | Theys et al. | 385/135 |
| 5,258,578 | 11/1993 | Smith et al. | 174/93 |
| 5,278,933 | 1/1994 | Hunsinger et al. | 385/135 |
| 5,288,946 | 2/1994 | Jackson et al. | 174/74 R |
| 5,308,923 | 5/1994 | Puigcerver et al. | 174/87 |
| 5,309,538 | 5/1994 | Larson | 385/98 |
| 5,323,480 | 6/1994 | Mullaney et al. | 385/135 |
| 5,353,366 | 10/1994 | Bossard | 385/134 |
| 5,420,957 | 5/1995 | Burek et al. | 385/135 |
| 5,446,823 | 8/1995 | Bingham et al. | 385/135 |
| 5,479,553 | 12/1995 | Daems et al. | 385/135 |
| 5,491,766 | 2/1996 | Huynh et al. | 385/100 |
| 5,495,549 | 2/1996 | Schneider et al. | 385/135 |
| 5,509,099 | 4/1996 | Hermsen et al. | 385/134 |
| 5,553,186 | 9/1996 | Allen | 385/135 |
| 5,568,584 | 10/1996 | Smith | 385/135 |
| 5,631,993 | 5/1997 | Cloud et al. | 385/135 |
| 5,633,973 | 5/1997 | Vincent et al. | 385/135 |

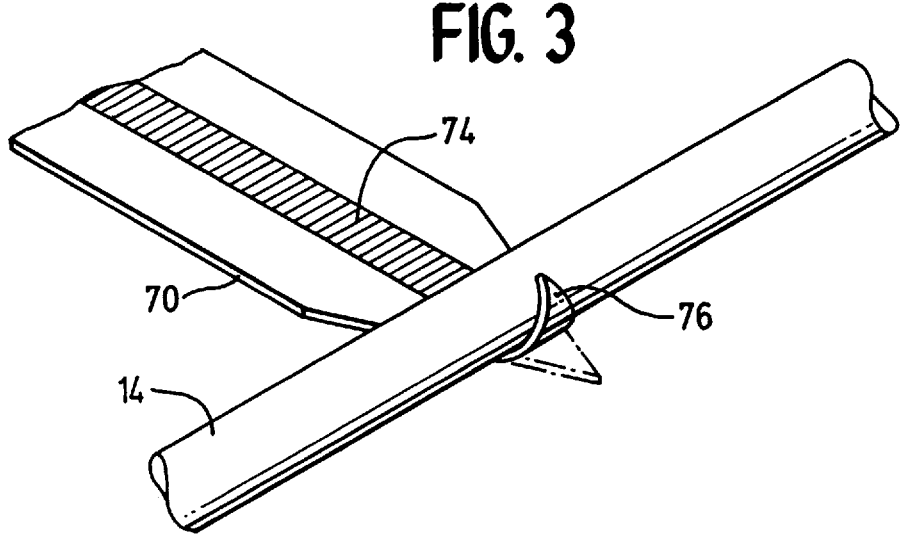
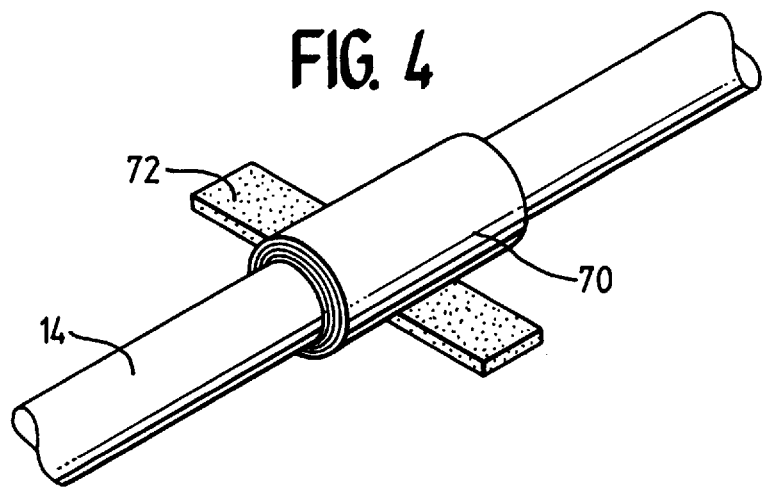
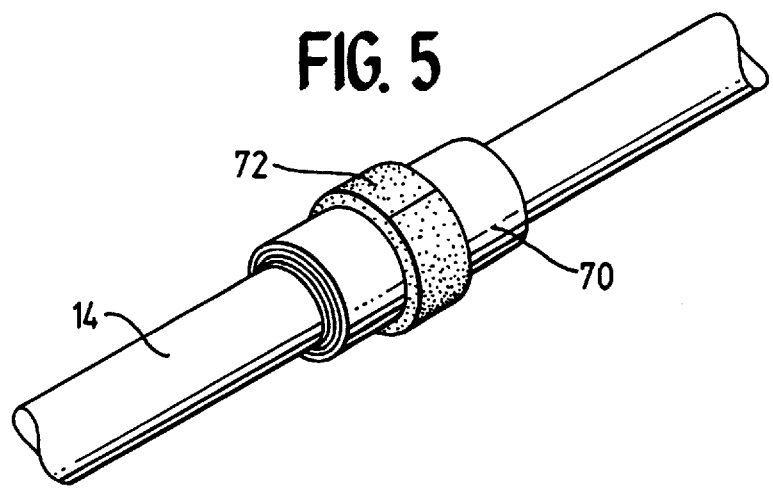

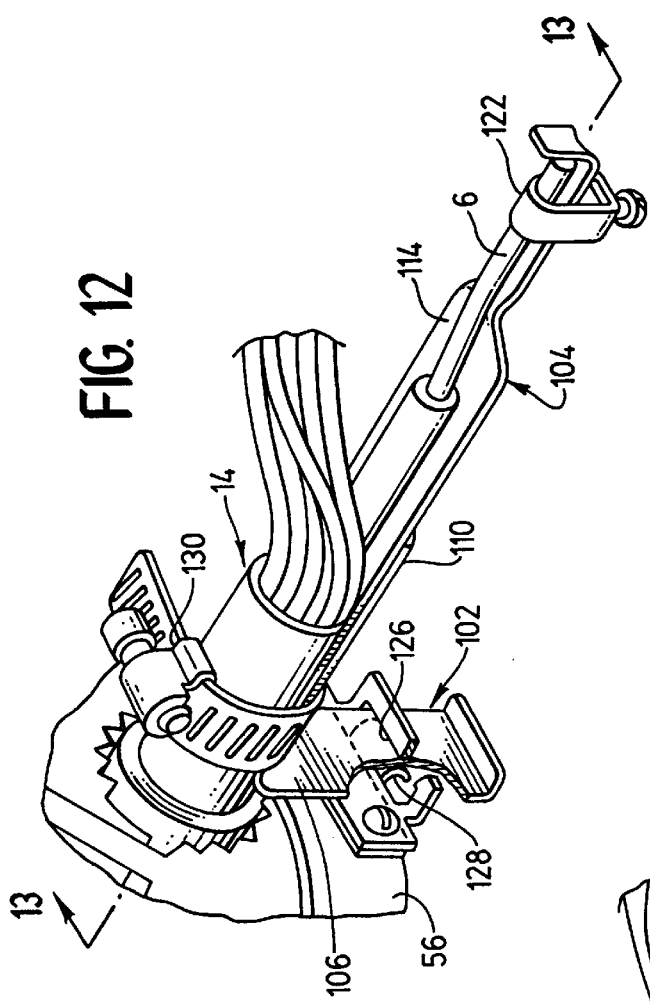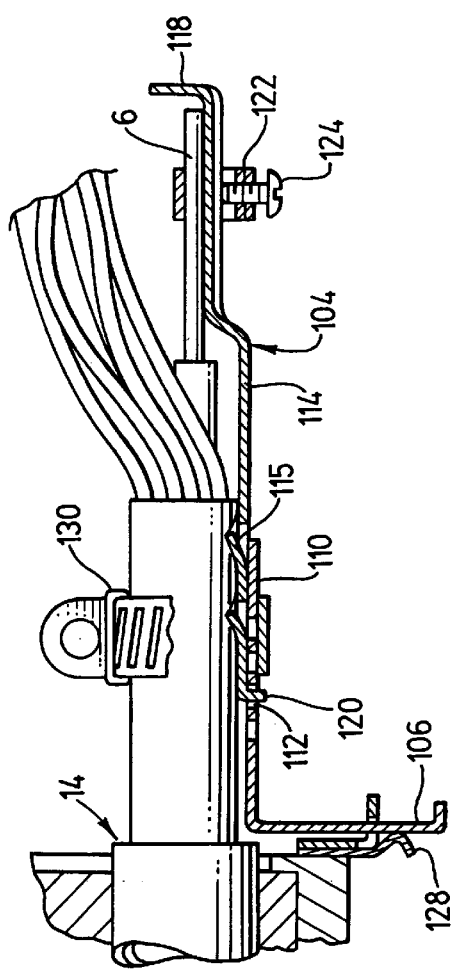

FIBER OPTIC CLOSURE WITH CABLE ADAPTER SPOOL

REFERENCE TO RELATED APPLICATIONS

This is a division of application Ser. No. 08/536,567, filed on Sep. 29, 1995, now abandoned, which application is a continuation in part of Ser. No. 08/407,210, filed Mar. 20, 1995, entitled "Fiber Optic Closure With Cable Adapter Spool," U.S. Pat. No. 5,568,584. This application is incorporated herein by this reference.

BACKGROUND

1. Field of the Invention

The present invention relates to telecommunications closure assemblies. More particularly, the present invention relates to fiber optic cable closures for enclosing fiber optic cable splices.

2. Description of Related Art

Typically, large diameter telephone distribution cables (e.g., approximately 3"in diameter) may be used to carry hundreds of pairs of electrically-conductive wires, such as copper wires, from a central office location to distribution points. Where two ends of such a cable are spliced together, the distribution cable is cut open, and pairs of wires are spliced together. The splice area is ordinarily housed within a protective cover known as a splice closure.

The spliced cable and closure may be subject to a great variety of environmental conditions. For example, the distribution cable and closure may be suspended in the air from a suspension strand with the total length of cable between suspension poles being 100–200 feet in length. In these cases, the closure must restrain each end of the cable with an axial force sufficient to overcome the forces created by repeated longitudinal expansion and contraction of the cable due to natural temperature changes. An end of the cable which is not adequately restrained by the closure may simply pull itself out of the closure due to the thermal expansion and contraction of the cable involved. At the same time, the point of entry of the cable into the closure must be hermetically sealed to protect the exposed wires within the closure from the external environment.

Electrically-conductive cables are typically restrained within a closure by a heavy duty hose clamp which is secured around the end of the cable, within the closure, and secured to the end plate of the closure with a strain relief bracket. The hose clamp puts a tremendous amount of radial force onto the cable, but holds the large cable securely without interfering with the electrical transmission of the signal. A hermetic seal is formed between the cable and the cable entrance port in the end plate by liberally applying a mastic material to the cable entrance port of the two halves of the end plate and securing the two halves around the cable. As the end plate bolts are tightened, the mastic flows between the cable and the end plate to form a seal which protects the interior of the closure from the external environment.

In recent years, communication via optical fiber cable has enjoyed a rapid rate of growth. Optical fibers provide the ability to transmit large quantities of information by light impulses and thus promise to increase in use in the future. Optical fiber cables are constructed in many configurations, all of which typically include three functional elements, a cable sheath which surrounds the optical fibers, a strength member to withstand cable tension during either placement or when permanently installed, and multiple very fine gauge optical fibers. In most cases the fine gauge optical fibers are organized and given additional protection in buffer tubes within the cable sheath.

The advantages of signal transmission over optical fibers includes increased capacity and the elimination of undesirable interference and cross-talk which may be present with conventional electrically-conductive wires. The increased capacity results in fewer optical fibers needed in each cable as compared to typical electrically-conductive cables. In addition, each optical fiber is significantly smaller in diameter than an electrically-conductive wire. For these reasons, a typical fiber optic cable has a fraction of the diameter of a typical electrically-conductive cable.

A disadvantage of the use of optical fibers is that light signals transmitted by optical fiber may be adversely impacted by excessive bending of the optical fiber. Excessive bending can significantly reduce the efficiency of light transmission as it travels along the optical fiber. Therefore, an optical fiber cable must be treated with more deference as compared to an electrically-conductive cable to prevent excessive radial bending and radial pressure on the optical fibers.

Similarly to electrically-conductive cables, splice points and drop points are used to connect fiber optic cables. At a splice point, for example, all of the fibers at one end of a cable are spliced to corresponding fibers of a tandem cable. At a drop point or express splice point, some of the fibers may be spliced to a drop cable, while most of the fibers are passed through the drop point unaltered. For both splice points and drop points, optical fibers are exposed from the protective cable sheath to be spliced and secured within a splice closure. At each access location where it is necessary to remove a portion of the cable sheath, it is necessary to protect the exposed optical fibers by a splice closure which restores mechanical and environmental protection for the optical fibers within the cable.

The splice closure typically includes a protective closure with either a single end plate assembly through which one or more cables penetrate, typically referred to in the art as a butt-splice; or dual opposing end plate assemblies through which respective cables penetrate, typically referred to in the art as an in-line splice. Such splice closures protects the fibers from breakage or bending which would induce attenuation loss or signal interruption. The buffer tube surrounding each group of optical fibers is maintained between the cable sheath opening and a protective splice tray which stores the optical fiber splices and exposed unprotected optical fibers.

One type of prior art fiber optic cable butt-splice closure employs one or more splice organizers, or splice trays, disposed in stacked arrangement within a protective closure. The trays are pivotally connected at one end to a mounting bracket which, in turn, is connected to the inside face of the closure end plate assembly. The pivotal connection permits individual splice trays to be temporarily moved to a raised position by the insertion of a removable spacer or clip near the pivot point. Accordingly, access is available to the underlying splice tray, such as to check fiber routing or to remake a defective splice.

Another prior art fiber optic cable splice closure includes a low-profile closure with multiple fiber optic cable entrance ports in either end of the fiber optic cable closure. The fiber optic cable sheath is restrained within the closure by wrapping the cable sheath with a pressure sensitive adhesive coated rubber tape and securing the wrapped cable with a hose clamp which is in turn secured to a strain relief bracket within the closure. The fiber optic cable strength member is secured within the closure by an anchor. The buffer tubes and optical fibers are organized within the closure according to two compartments. The top compartment protects and secures the spliced fibers while the bottom compartment retains the buffer tubes. A hermetic seal is provided between the cable and the cable entrance port by wrapping the fiber optic cable with a sealing tape formed of a mastic material and capturing the wrapped cable in the entrance port as the closure is sealed.

The prior art fiber optic closures are specifically manufactured for use with fiber optic cables. These closures typically cannot be used with electrically-conductive cables because the cable entrance ports are too small to accommodate larger diameter electrically-conductive cables. In addition, the specialized hardware permanently mounted within the fiber optic cable closures leaves little room for splicing and maintaining the comparatively large number of connections required in an electrically-conductive cable closure.

An enormous amount of capital has been invested in the existing telecommunications infrastructure which is designed to accommodate electrically-conductive cables. More specifically, literally millions of closures, such as "2-type" closures as disclosed in U. S. Pat. No. 5,558,174, entitled "Cable Closure," and U.S. Pat. No. 4,538,021, entitled "Cable Closure Having Asymmetrical End Plate Assembly," each of which is incorporated herein by reference, have been installed and maintained throughout the world to splice together electrically-conductive cables.

Manufacturing and assembly lines set up for an electrically-conductive cable closure cannot be used, without modification, for fiber optic closures. Therefore either two separate facilities are required or a single manufacturing line must be modified between electrically-conductive cable and fiber optic cable closures, depending on demand. Also, a telecommunications company which installs both optical fiber cable and electrically-conductive cable typically maintains a complete inventory of both optical fiber cable closures and electrically-conductive cable closures as well as their corresponding repair kits and specialized tools. Furthermore, all installation and maintenance technicians are trained in installing and maintaining both types of closures or two separate teams of installation and maintenance personnel are required. As can be seen, introducing optical fiber cable closures into the inventory of a telecommunications company dramatically increases inventory and personnel costs, even if the new optical fiber cable closure costs an amount equivalent to that of an electrically-conductive cable closure.

For the foregoing reasons, there is a need to provide a fiber optic cable splice closure design which exploits some or all of the existing manufacturing, installation and/or maintenance features of copper cable closure designs. There is further a need to provide a means to adapt existing electrically-conductive cable closures to serve as fiber optic cable splice closures.

SUMMARY

The present invention is directed to an apparatus that satisfies the above noted needs.

In accordance with a preferred embodiment, the splice closure assembly of the present invention comprises two end plate assemblies, at least one of which has an opening of a first diameter, and a closure base and a closure cover attached to the end plate assemblies. An adapter is provided to alter the end plate opening from the first diameter to a second diameter to accommodate a fiber optic cable and to provide a seal between the optical fiber cable, the adapter and the end plate assembly. The adapter has an outer diameter which matches the first diameter and has a cable entrance port having a second diameter for receiving the optical fiber cable therein. The adapter is secured within the opening in the end plate assembly. The splice closure assembly also includes means for anchoring an optical fiber cable strength member to the end plate assembly to ensure the fiber optic cable is properly supported within the closure. In addition, the splice closure assembly includes an optical fiber cable sheath restraining member. In order to further adapt the interior of the closure for use with optical fiber cable, the closure further comprises a mounting bar secured to the end plate assemblies proximate the closure base and a mounting platform secured to the mounting bar. A spacer is included between the mounting platform and the mounting bar to provide a storage area for excess lengths of buffer tubes.

In an alternate embodiment, the splice closure assembly further comprises a fiber optic splice tray for retaining optical fibers which is releasably secured to the mounting platform; a fiber optic buffer tube guide secured to the mounting bar for retaining buffer tubes during opening and closing of the closure; or closure stabilization lugs which may be secured to the closure base for inhibiting excessive movement by the closure base during installation and maintenance operations.

In an alternate embodiment, the present invention provides a closure conversion kit for converting a splice closure assembly adapted for use with an electrically-conductive cable splice into a splice closure assembly for use with an optical fiber cable splice. In a preferred embodiment, the conversion kit comprises an end plate adapter, a bracket for anchoring the optical fiber strength member, and a means for restraining the optical fiber cable sheath relative to the bracket. The kit may further comprise a mounting bar which may be secured to the end plate assemblies as well as a mounting platform which is secured to the mounting bar by a spacer to provide a storage area between the mounting platform and the mounting bar.

As further features the kit may further include one or more of: a fiber optic splice tray for retaining optical fibers which is releasably secured to the mounting platform; a fiber optic buffer tube guide secured to the mounting bar for retaining buffer tubes during opening and closing of the closure; and closure stabilization lugs which may be secured to the closure base for inhibiting excessive movement by the closure base during installation and maintenance operations.

In an alternate embodiment, the present invention provides a method for converting a splice closure assembly for enclosing an electrically-conductive cable splice into a splice closure assembly for enclosing an optical fiber cable splice, which splice closure assembly is provided with two end plate assemblies, at least one of which has an opening of a first diameter, a closure base and a closure cover attached to the end plate assemblies, and wherein the cable has a third diameter and includes an optical fiber cable sheath, a strength member, and a plurality of optical fibers within a plurality of fiber optic buffer tubes. The method comprises securing a mounting bar, having thereon assembled a fiber optic splice tray platform which is separated from the mounting bar by spacers, to each end plate assembly. Tape having a high coefficient of friction and a narrow strip of adhesive applied to one side is provided. An adapter spool which may be expanded and contracted is provided, the contracted adapter spool having a first diameter and one or more adapter spool cable entrance ports having a second diameter.

The method includes applying the adhesive side of the tape around the cable to form a seal between the cable and the tape and wrapping the tape around the cable until the diameter of the wrapped cable is equivalent to the second diameter. Cable preparation is concluded by wrapping the wrapped cable with a layer of mastic sealant around a strip around the longitudinal center of the neoprene tape of the wrapped cable and placing the wrapped cable into an adapter spool cable entrance port of an expanded adapter spool.

In this method the adapter spool is contracted to exert radial force on the wrapped cable, wherein the wrapped cable is sealed and restrained within the cable entrance port of the contracted adapter spool and wherein the contracted adapter spool has a first diameter. The contracted adapter spool may then be placed into the opening of the end plate and the end plate secured within the closure assembly.

In an alternate embodiment the method may include securing one or more buffer tube guides to the mounting bar and inserting one or more stabilizer lugs into through-holes of the closure base to stabilize the closure base during conversion operations. In addition, the method may include securing the strength member to an anchoring platform of a cantilevered member before the step of placing the wrapped cable into the adapter spool cable entrance port; securing a bracing member to the end plate assembly proximate the opening in the end plate; and securing the cantilevered member to the bracing member using a hose clamp after the step of placing the contracted adapter spool into the opening of the end plate.

In an alternate embodiment, the splice closure assembly comprises an adapter spool for adapting an opening in an end plate assembly to accommodate one or more smaller diameter cables. The adapter spool has an outer diameter matching the diameter of the cable port in the end plate assembly and has one or more cable entrance ports having a second diameter for receiving an optical fiber cable therein. The cable sheath is preferably prepared with tape and mastic before installation into the adapter spool. The adapter spool is contracted to secure the optical fiber cable within the cable entrance port and to restrain the optical fiber cable sheath.

The adapter spool comprises an annular flange having a plurality of gripping teeth which extend radially inward toward the center of the cable entrance port is provided to restrain the cable sheath against axial loads. In an alternate embodiment, a raised rib which extends toward the center of the cable entrance port may be provided to restrain the cable sheath against axial loads. Preferably, two annular flanges and two raised ribs are provided proximate a front end and a back end of the adapter spool for sheath retention by the adapter spool.

In another embodiment, the present invention comprises a method for adapting a cable to an end plate assembly having a cable entrance port of a first diameter, the cable having a third diameter and having a sheath, the method for adapting comprising the steps of providing tape having a high coefficient of friction and having a narrow strip of adhesive applied to one side and applying the adhesive side of the tape around the cable to form a seal between the cable and the tape. Further the method includes providing an adapter spool which may be expanded and contracted, the contracted adapter spool having a first diameter and one or more adapter spool cable entrance ports having a second diameter. The tape is wrapped around the cable until the diameter of the wrapped cable is equivalent to the second diameter and the cable wrapping is concluded by wrapping the wrapped cable with a layer of mastic sealant around a strip around the longitudinal center of the neoprene tape of the wrapped cable and placing the wrapped cable into an adapter spool cable entrance port of an expanded adapter spool. The adapter spool may then be contracted to exert radial force on the wrapped cable, wherein the wrapped cable is sealed and restrained within the cable entrance port of the contracted adapter spool and wherein the contracted adapter spool has a first diameter.

In yet another embodiment, the present invention comprises a bracket assembly for anchoring an optical fiber cable strength member to an end plate assembly of a splice closure assembly, the end plate assembly having a slotted bracket secured thereto. The bracket assembly provides a cantilevered member having a pin integrally formed therein and a means for retaining the strength member. The bracket assembly further comprises a bracing member secured to the end plate by the slotted bracket. The bracing member comprises a bracing leg having a series of cantilevered member retaining holes adapted to receive the pin and a hose clamp. The hose clamp is secured around the optical fiber cable sheath, the cantilevered member and the bracing leg, and is tightened to provide sufficient radial force against the combination of optical fiber cable sheath, the cantilevered member and the bracing member to secure the cantilevered member to the bracing leg of the bracing member.

The cantilevered member further comprises sheath retainers integrally formed with the cantilevered member proximate the location where the hose clamp is secured which serves to further retain the cable sheath when the hose clamp is secured. The bracket assembly further comprises an anchor bolt, a collar for retaining the strength member, the collar having a threaded opening adapted to receive the anchor bolt; and an anchoring platform to secure the strength member to the anchoring platform between the collar and the anchoring platform by actuating the anchor bolt.

BRIEF DESCRIPTION OF THE DRAWINGS

These and other features, aspects, and advantages of the present invention will become better understood with regard to the following description, appended claims, and accompanying drawings where:

FIG. 3 is a perspective view which illustrates preparing a fiber optic cable with rubber-like tape prior to securing the prepared cable within the fiber optic cable adapter spool of the present invention.

FIG. 4 is a perspective view illustrating preparing the wrapped fiber optic cable with sealing compound prior to securing the prepared cable within the fiber optic cable adapter spool of the present invention.

FIG. 5 is a perspective view illustrating the prepared fiber optic cable.

FIG. 12 is a top perspective view of the anchoring bracket assembly, the hose clamp and the end plate of the fiber optic cable splice closure of the present invention.

FIG. 13 is a cross-sectional view of the anchoring bracket assembly of the present invention.

DETAILED DESCRIPTION

A detailed description of the present invention will now be presented in conjunction with the embodiment of the present invention illustrated in FIGS. 1–15, wherein like reference numbers refer to like elements.

Figure 1:
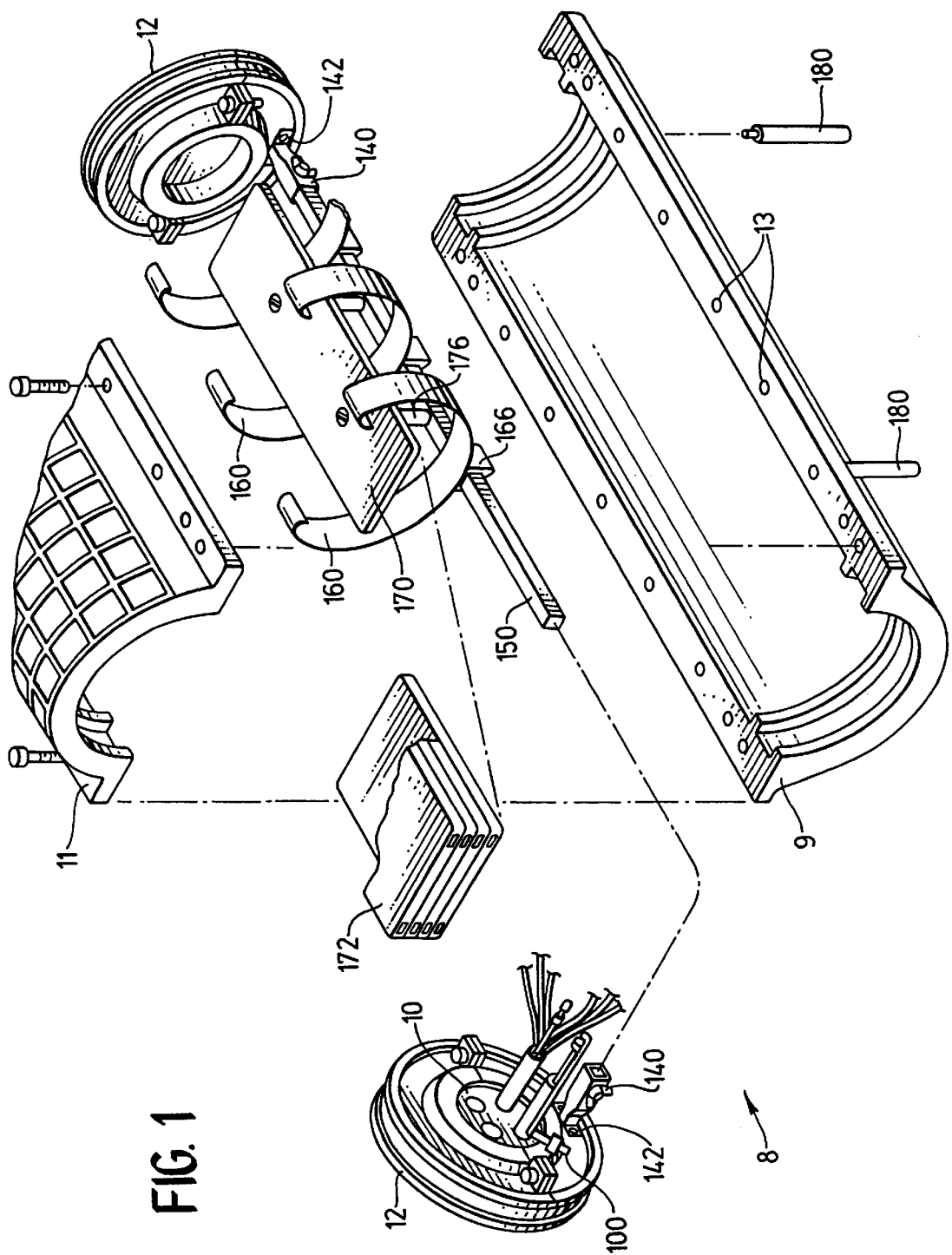
FIG. 1 is an exploded view of the primary components of the fiber optic cable splice closure of the present invention.

An optical fiber cable closure in accordance with a preferred embodiment of the present invention is shown in FIG. 1. The closure 8 comprises two end plate assemblies 12, a closure base 9 and a closure cover 11. The base 9 and cover 11 are formed of durable plastic, or other suitable material as is known in the art to withstand harsh environmental conditions. The base 9 and cover 11 each include bolt through-holes 13 used in opening and closing the closure 8 as will be described in more detail below.

Each end plate assembly 12 is provided with a cable entrance port which is adapted to receive an adapter spool 10, as further described below, or is sealed against the environment with an end plate assembly plug. In an in-line splice closure application it will be appreciated that each end plate assembly is outfitted with an adapter spool 10. In a butt-splice closure application, as shown in FIG. 1, it will be appreciated that only one of the end plate assemblies will be provided with an adapter spool 10 and the other end plate assembly will be sealed against the environment with an end plate assembly plug. In an alternative embodiment of a butt-splice closure application, the sealed end of the closure may be provided by installing a portless end plate assembly, such as a drillable end plate assembly, in which a cable entrance port has not been added and is therefore easier to seal against the environment.

The closure 8 also includes an adapter assembly. The adapter assembly includes an anchoring bracket assembly 100, a mounting sleeve 140, a mounting bar 150, a buffer tube guide 160, a fiber optic splice tray platform 170 and a closure stabilizing lug 180, the structure and function of each which is described further below.

Figure 2:
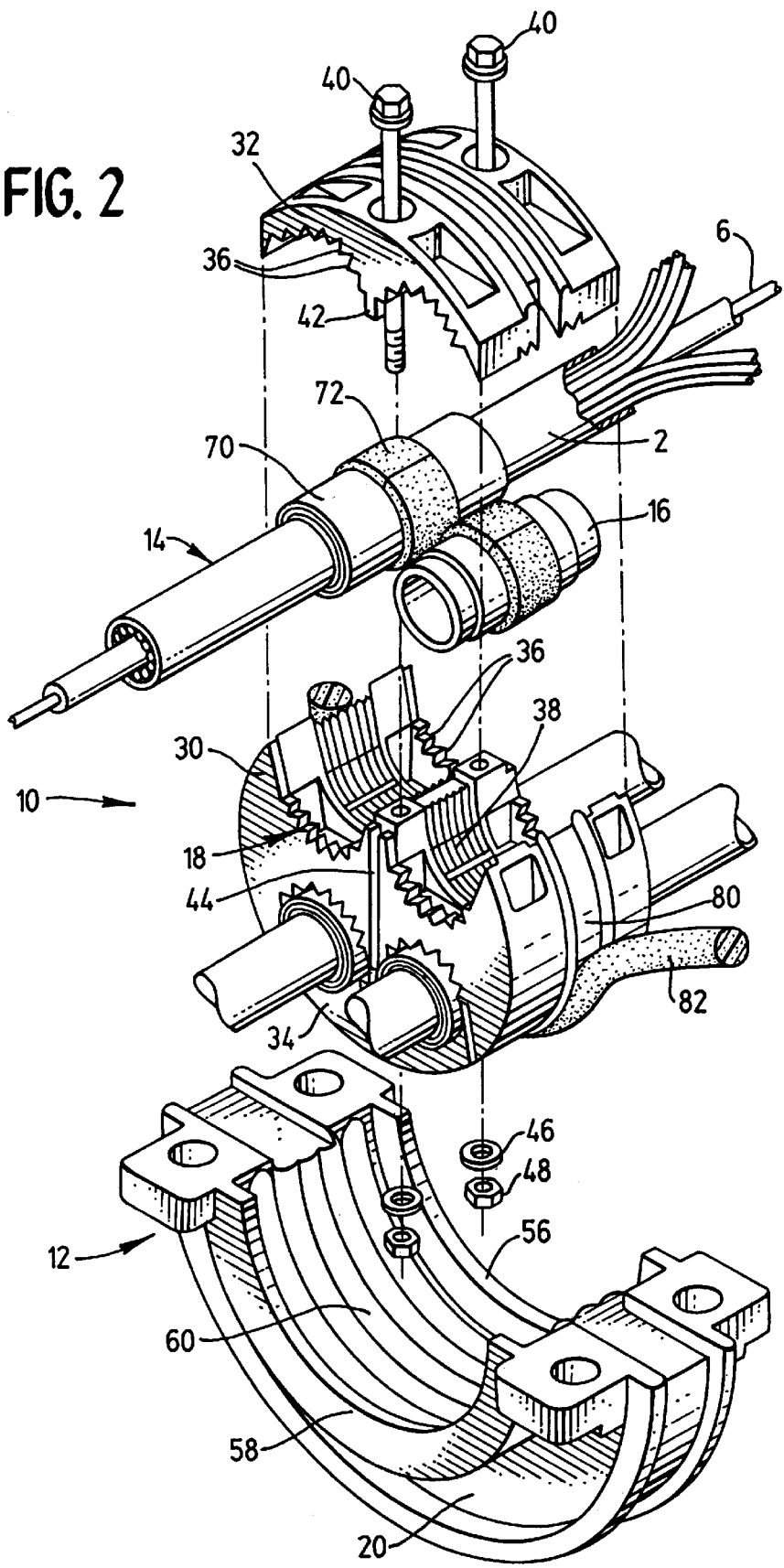
FIG. 2 is an exploded view of the primary components of the fiber optic cable adapter spool of the present invention and the bottom half of an end plate.

The adapter spool 10 as shown in FIG. 2 is formed to fit within an end plate assembly 12 of a typical electrically-conductive cable splice closure assembly 8. The adapter spool 10 may be formed of any suitable hard plastic or other material having the same properties as typically used in forming closures. The adapter spool 10 provides one or more cable entrance ports 18 each capable of supporting an optical fiber cable 14, typically ¾" in diameter, in conventional telecommunication applications. In a presently preferred embodiment, four ports 18 may be employed. Other applications may require an adapter spool 10 for supporting optical fiber cables 14 of a smaller size. In such applications, the adapter spool 10 would include additional cable entrance ports 18, each of a smaller diameter consistent with the reduced size of the optical fiber cable. Alternatively, other applications may require an adapter spool 10 for supporting optical fiber cables of a larger size. In such applications, the adapter spool 10 would include fewer cable entrance ports 18 each of a larger diameter consistent with the increased size of the larger diameter optical fiber cable.

In yet other applications, the adapter spool 10 may be needed in applications having a larger diameter cable entrance port 18 in the existing end plate assembly 12. In such applications, the adapter spool may be increased in size to accommodate the larger diameter and provide the required cable entrance ports.

The fiber optic cable adapter spool, although optimized for restraining and securing optical fiber cables in existing electrically-conductive cable closures, may also support existing electrically-conductive cables where required. In such applications each cable may include a hybrid of electrically-conductive wires and optical fibers. The adapter spool may also support a mix of electrically-conductive cables and optical fiber cables as the need exists.

In a preferred embodiment, the adapter spool as shown in FIGS. 1 and 2 restrains and seals four ¾" optical fiber cables 14 in a 3" cable entrance port in a conventional end plate assembly 12. As shown, if fewer than 4 cables are required, a plug 16 is provided to seal any vacant adapter cable entrance ports 18.

An exploded view of the primary components of the fiber optic adapter spool of the present invention and an associated end plate portion 20 are shown in FIG. 2. The adapter spool 10 includes a central portion 30, a top portion 32 and a bottom portion 34, which, when assembled, form a circular disk. The top portion 32 and the bottom portion 34 are identical in construction. Each of the three portions have a plurality of annular gripping teeth 36 and annular sealing ribs 38.

The gripping teeth 36 are provided as a flange which extends toward the center of each cable entrance port 18 and are displaced in an arcuate configuration at the front and back ends of the central portion 30, top portion, 32 and bottom portion 34 of the adapter spool 10. The length of the gripping teeth 36 is determined such that when the adapter spool is assembled around an optical fiber cable 14, the gripping teeth 36 extend centrally to bite into and restrain the prepared cable 14 as will be described further below.

The sealing ribs 38 are provided between the gripping teeth 36 along a middle, interior portion of each of the central portion 30, top portion 32, and bottom portion 34 of the adapter spool 10. The peaks of the sealing ribs 38 are recessed below the height of the surface of the cable entrance ports 18 to form a trough. The valleys between the sealing ribs are recessed further to provide a slightly wider diameter as compared to the inner surface of the cable entrance port and the trough defined by the peaks of the sealing ribs 38. The sealing ribs 38 are aligned perpendicular to the cable 14 in the cable entrance port 18 of the adapter spool 10. The sealing ribs 38 do not extend laterally as far as the gripping teeth 36. A gap is provided between the sealing ribs 38 and the gripping teeth 36 to ensure no sealing material interferes with the function of the gripping teeth 38.

As shown in FIG. 3, the cable 14 or plug 16 must be prepared before being placed into and secured by the adapter spool 10. The end of the optical fiber cable 14 to be secured within the adapter spool 10 is wrapped with a continuous length of thin, adhesively-backed rubber-like tape 70. The tape is formed of a rubber-like material such as neoprene or similar such material having the same qualities of flexibility, high coefficient of friction and resistance to harsh environmental conditions. The high coefficient of friction of the neoprene tape with itself ensures that the fiber optic cable sheath, wrapped in several layers of neoprene tape 70, will not pull out of the cable entrance port of the adapter spool, nor will the neoprene tape telescope, under the expected axial loading conditions.

A thin layer of adhesive coating 74 is provided to seal each layer of tape against the previous layer of tape or the cable as in the case of the first layer of neoprene tape. The adhesive also assists the operator in wrapping the optical fiber cable by allowing the operator to start wrapping in a precise location on the optical fiber cable. The adhesive coating 74 is preferably limited to one side of the neoprene tape 70 and is minimally applied to a narrow central portion of the neoprene tape to seal each layer of tape. A minimal amount of adhesive is used to maximize the resistance provided by the tape-on-tape friction.

The neoprene tape 70 should be at least as wide as the adapter spool 10 in order to ensure the gripping teeth 36 may grip either side of the neoprene tape 70 as will be discussed further below. Preferably the neoprene tape 70 is slightly wider than the width of the adapter spool 10.

As shown in FIG. 3, the end of the neoprene tape 70 to first be applied to the optical fiber cable 14 is cut into an elongated "v" or point 76. This method of applying the neoprene tape 70 to the cable 14 minimizes the possibility of moisture or other harmful elements entering the closure through the interface between the neoprene tape 70 and the optical fiber cable 14.

As shown in FIG. 4, once the point of the neoprene tape 70 is applied to the sheath of the optical fiber cable 14, the neoprene tape 70 is wound around the optical fiber cable 14 until the diameter of the combination of cable and tape has been built up to fit securely within a cable entrance port 18 of the adapter spool 10. A cable gauge may be provided (not shown) which corresponds to a cable entrance port 18 diameter. The gauge may be applied by the cable preparer to the neoprene tape wrapped cable in order to determine when the diameter of the neoprene tape wrapped cable has been extended sufficiently to fit snugly within an adapter cable entrance port. This method permits optical fiber cables of varying sizes to be secured within a single size adapter cable entrance port 18. In practice, therefore, a smaller diameter optical fiber cable may be wrapped with additional neoprene tape until the diameter of the wrapped cable reaches the desired diameter as indicated by the cable gauge. Similarly, a larger diameter cable may be wrapped to a lesser extent to reach the desired diameter.

Still referring to FIG. 4, a thin layer of sealing material such as mastic 72 is applied over the outer layer of neoprene tape 70 of the wrapped cable 14. The mastic 72 is of generally the same width as the trough provided by the sealing ribs 38 (shown in FIG. 2) of the adapter spool 10. The mastic 72 is a flexible sealant which provides a moisture seal and is resistant to harmful environmental elements such as hydrocarbons, fungus and fire. The mastic 72 is sticky, or tacky, but is pliable such that it will flow when pressure is applied. The final prepared cable 14 as shown in FIG. 5 is wrapped with multiple layers of neoprene tape 70 and a single layer of mastic material 72. Additional layers of mastic 72 may be applied if the initial amount does not provide an adequate seal.

A cable plug 16 is typically not wrapped with neoprene tape 70 in preparation for installation in an adapter cable entrance port 18. The cable plug diameter is consistent with the diameter of the cable entrance port 18 and requires only a layer of mastic 72 for proper sealing.

Alternately, under conditions where a hermetic seal is not required, the neoprene tape may be applied without the adhesive. This embodiment permits maximum tape-on-tape friction, thus generating greater friction and consequently greater resistance to axial loads.

In another embodiment, it may be preferred in certain circumstances to initially wrap the cable 14 in a layer of mastic 72, substantially similar to the mastic applied in reference to FIGS. 4 and 5. This first layer of mastic may provide an improved seal between the tape 70 and the cable 14. The neoprene tape 70 is then wound around the optical fiber cable 14 as described above with reference to FIGS. 4 and 5. In this embodiment, alternately, the first layer of mastic may be wrapped with a neoprene tape which does not have an adhesive layer.

As shown in FIG. 2, after each cable 14 or plug 16 has been properly prepared with neoprene tape 70 and mastic 72, the cable 14 or plug 16 is placed into the adapter spool 10 between the central portion 30 and either the top portion 32 or the bottom portion 34, as desired by the user.

Figure 9:
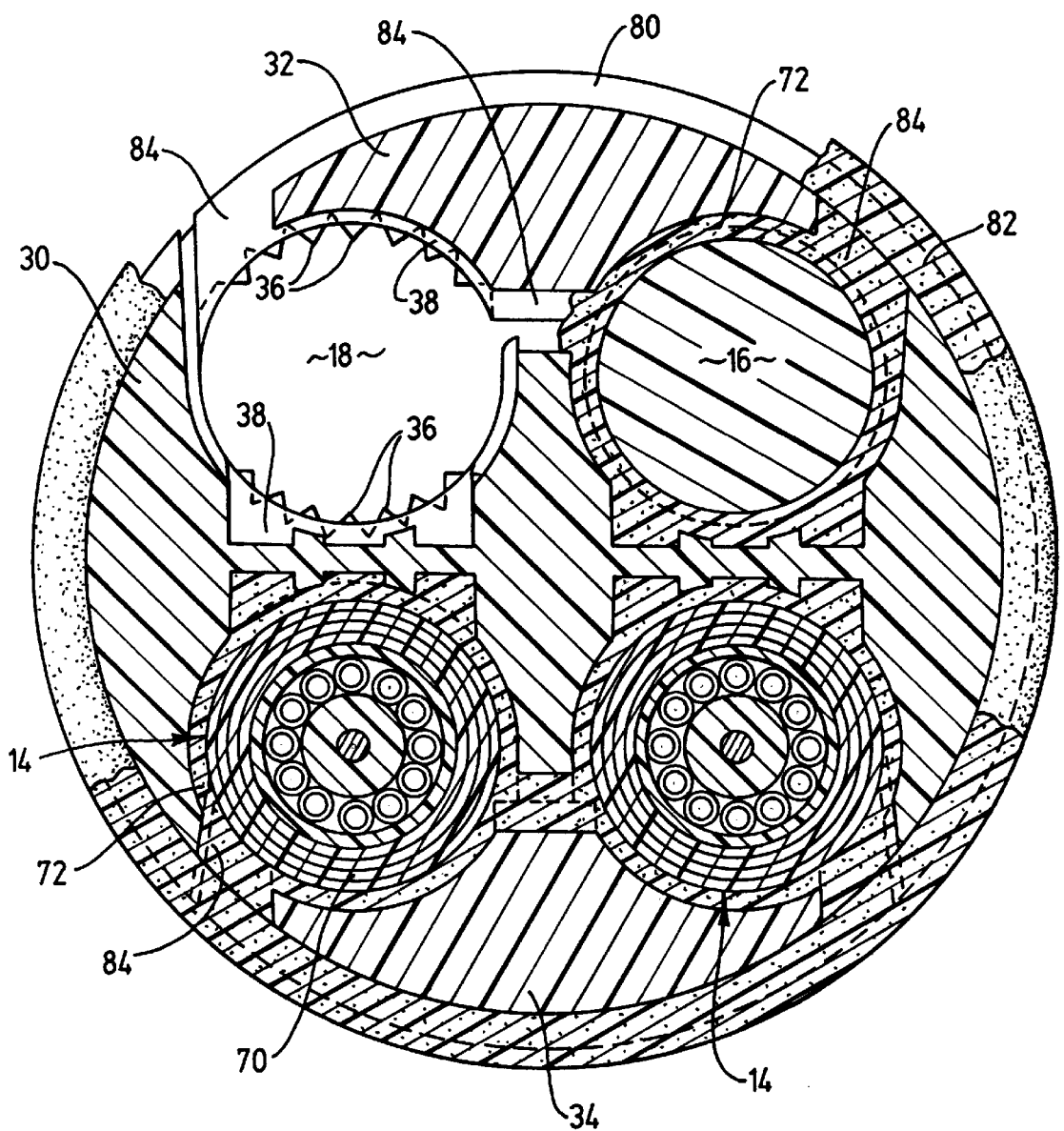
FIG. 9 is a top view taken along line 9—9 of FIG. 7 showing a cross-section of a preferred embodiment of the fiber optic cable adapter spool of the present invention.

As best shown in FIG. 9, the top portion 32 and the bottom portion 34 are secured to the central portion 30 using a pair of fasteners such as bolts 40 which are secured by washers 46 and nuts 48. To assist alignment, top portion 32 and bottom portion 34 are provided with guides 42 which extend towards the center of the adapter spool 10. The central portion 30 is provided with guide slots 44 formed on the front surface and the back surface of the central portion 30. Once the guides 42 and guide slots 44 have been aligned between the central portion 30, the top portion 32 and the bottom portion 34, the bolts 40 may be tightened using washer 46 and nut 48 to secure the prepared optical fiber cables 14 within the adapter cable entrance ports 18 of the adapter spool 10. Alternatively, the top and bottom portions of the adapter spool may be secured separately to the central portion by means of screws which tap into the plastic of the central portion.

Figure 6:
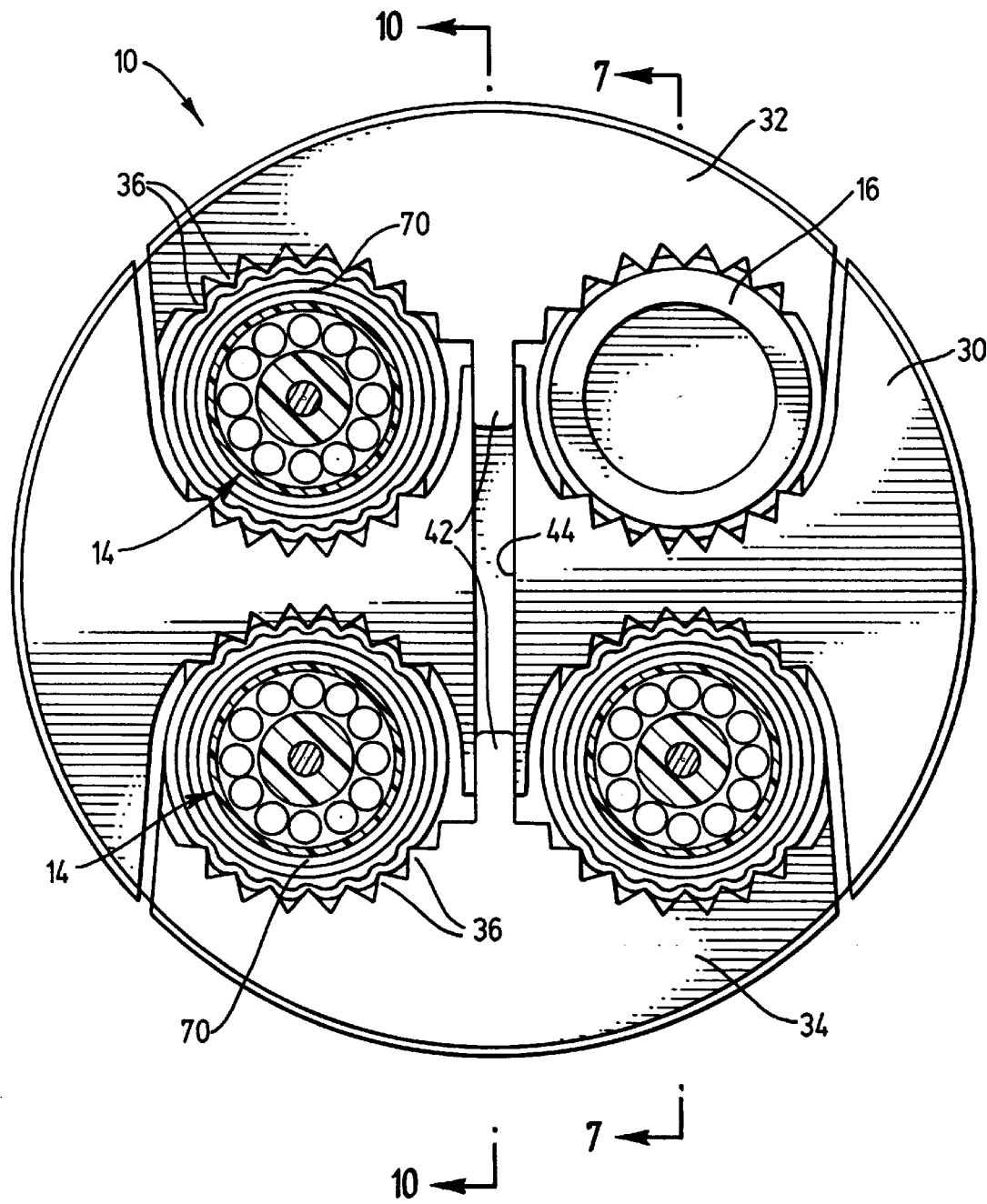
FIG. 6 is a top plan view of a preferred embodiment of the improved fiber optic cable adapter spool of the present invention.

As shown in FIG. 6, once the adapter spool 10 is assembled, the gripping teeth 36 come into contact with the neoprene tape 70 wrapped around the optical fiber cable 14. As the bolts are tightened further, a radial force builds between the gripping teeth 36 and the neoprene tape 70 and the adapter spool 10 assumes a disk shape.

Figure 7:
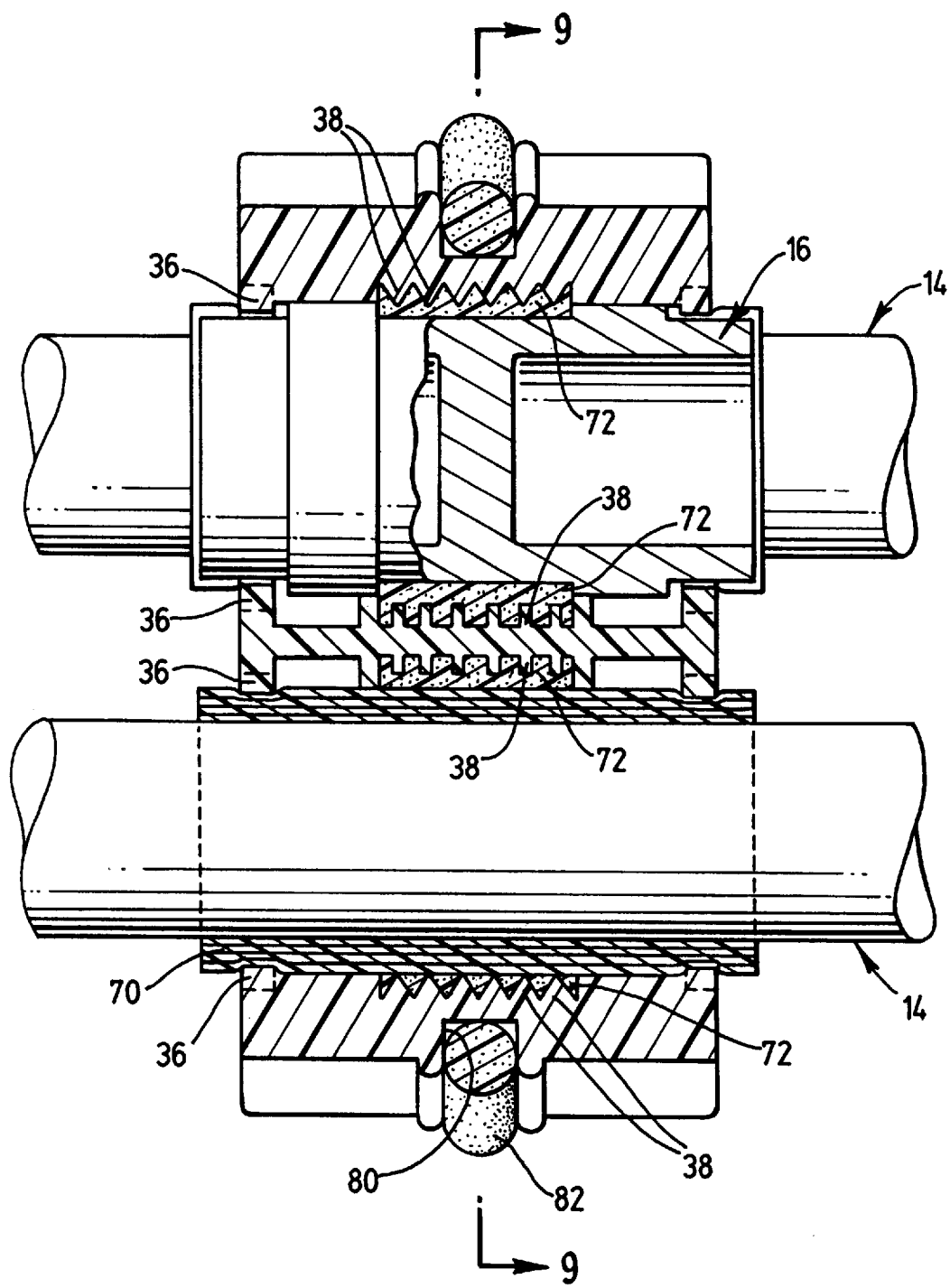
FIG. 7 is a side view taken along line 7—7 of FIG. 6 showing a cross-section of a preferred embodiment of the fiber optic cable adapter spool of the present invention.

As shown in FIG. 7, more specifically, radial force is generated between the gripping teeth 36 at the front of the adapter spool and the gripping teeth 36 at the back of the adapter spool, and the neoprene tape 70. The combination of neoprene tape 70 and two sets of gripping teeth 36, one on the front of the adapter spool and one on the back of the adapter spool is capable of maintaining the cable sheath in place in the face of considerable axial pull forces.

As shown in FIG. 7, the gripping teeth 36 are provided in the front and back of the adapter spool 10. The gripping teeth 36 therefore spread the radial force on the cable 14, reducing the radial force at any single point in the cable. The reduced radial force helps prevent microbending which can interfere with or reduce the efficiency of light transmission in an optical fiber cable. Radial force is further spread by the neoprene tape. The neoprene tape generates a prepared cable of a significantly larger diameter than the original cable. The greater diameter permits the force generated on any single point of the cable to be spread over a greater distance. In addition, the additional neoprene material protects the cable sheath from possible tears or punctures which could otherwise result from gripping teeth biting into a cable sheath.

The optical fiber cable sheath is maintained within the adapter cable entrance port 18 against axial pull force by the two sets of gripping teeth 36 which are firmly set into the neoprene tape 70. The high coefficient of friction of the neoprene tape 70 in combination with the adhesive backing 74 (as shown in FIG. 3) prevents the neoprene tape 70 from telescoping when axial force is applied to the optical fiber cable sheath. For the same reasons, the optical fiber cable sheath resists pulling out from the neoprene tape 70.

Figure 8:
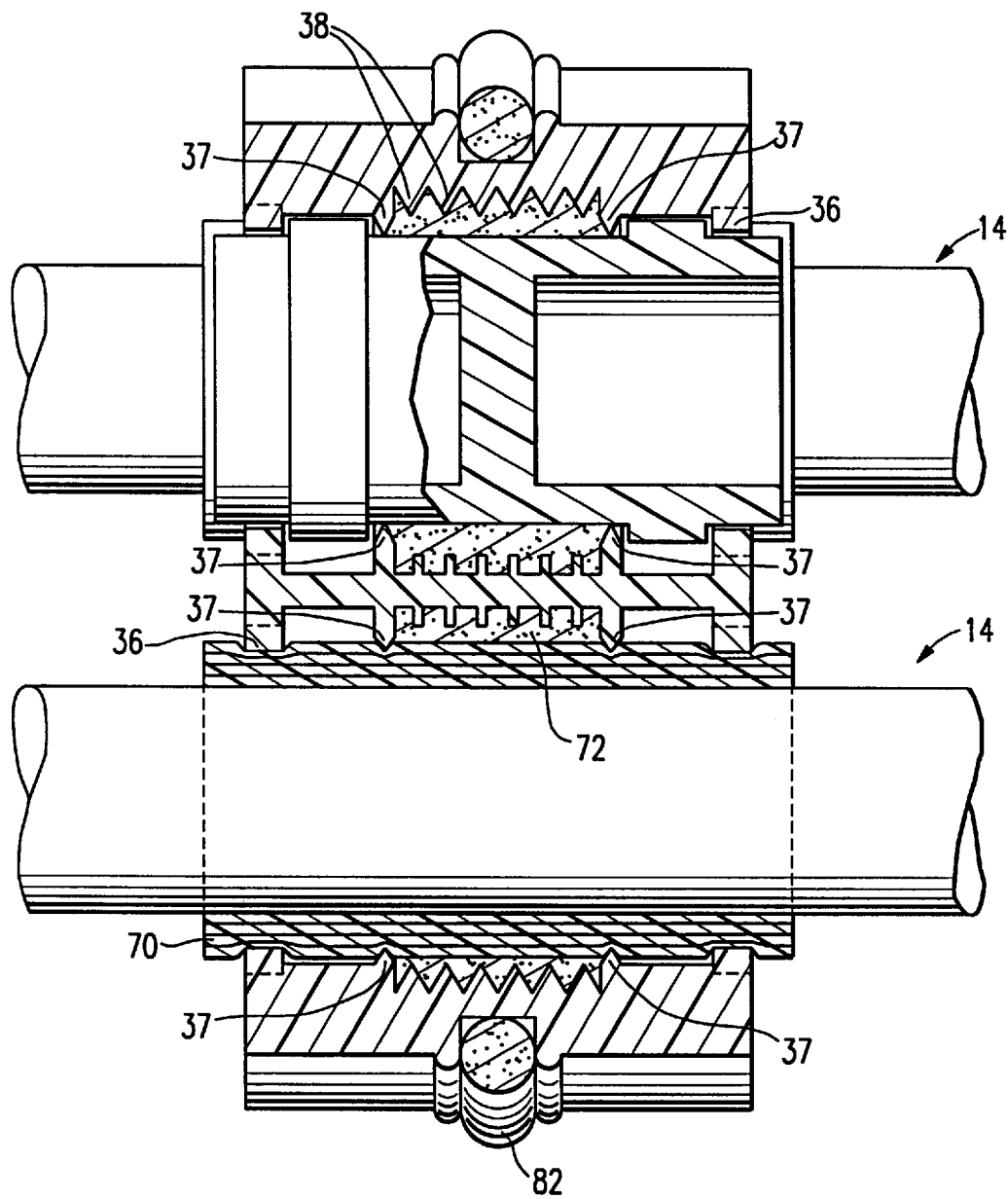
FIG. 8 is an alternate embodiment of the fiber optic cable adapter spool of the present invention as shown in FIG. 7.

As shown in FIG. 8, in an alternate embodiment of the adapter spool 10, the adapter spool 10 includes a central portion 30, a top portion 32 and a bottom portion 34, which include a plurality of gripping ribs 37. Each gripping rib 37 is provided as an annular rib which extends toward the center of the cable entrance port 18 and is displaced in an arcuate configuration between the gripping teeth 36 and the sealing ribs 38 of the central portion 30, top portion, 32 and bottom portion 34 of the adapter spool 10. The height of each gripping rib 37 is determined such that when the adapter spool is assembled around an optical fiber cable 14, the gripping rib 37 extends centrally to bite into and restrain the prepared cable 14 as will be described further below. Although the prepared cable 14 may be adequately restrained with the gripping teeth 36, the addition of gripping ribs provides additional restraining power for an added measure of security. Preferably, two gripping ribs 37 are provided in each cable entrance port 18. Additional gripping ribs 37 may be added as desired. In an alternative embodiment, the location of the gripping teeth and the gripping ribs may be exchanged.

Figure 10:
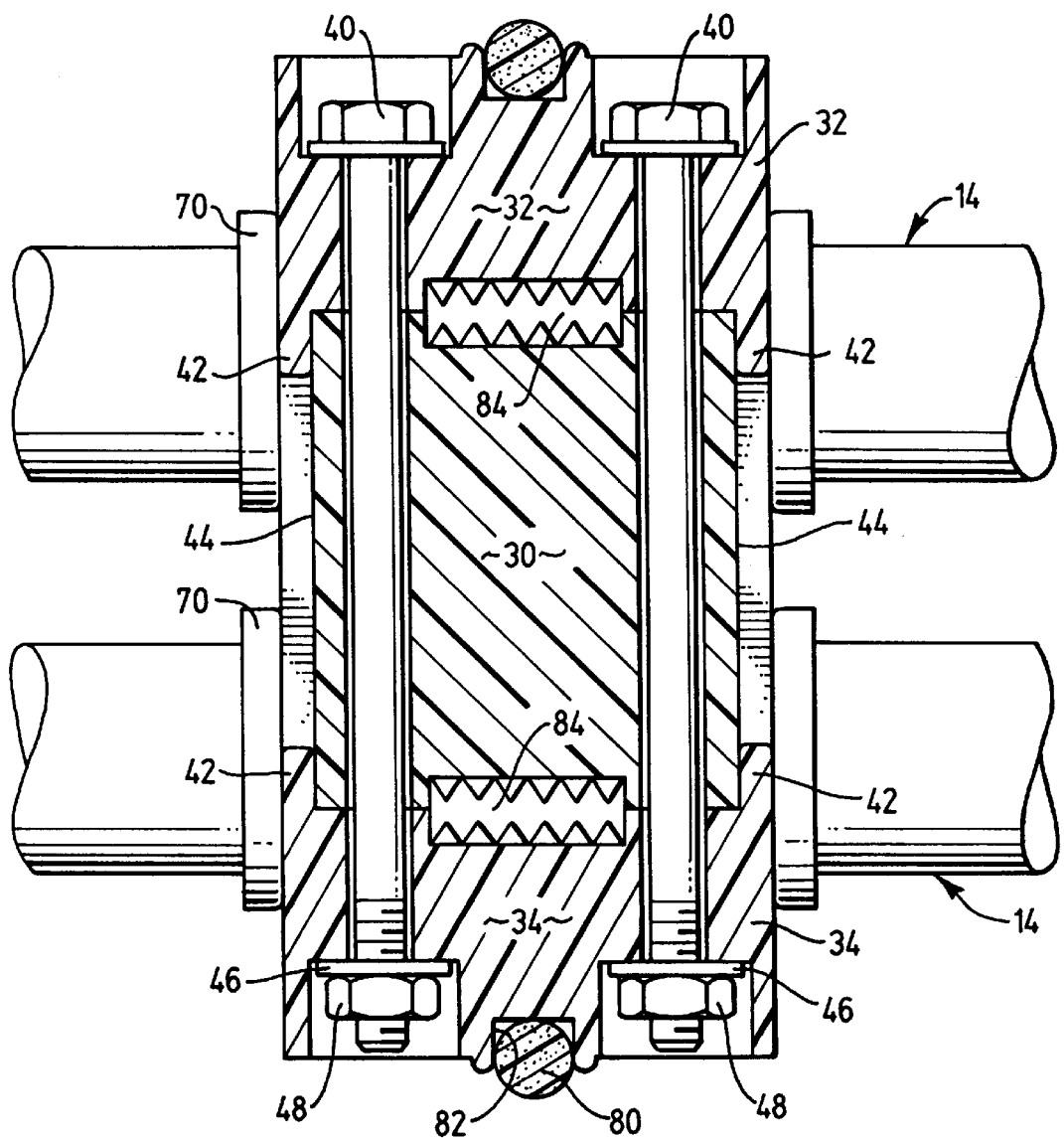
FIG. 10 is a side view taken along line 10—10 of FIG. 6 showing a cross-section of a preferred embodiment of the fiber optic cable adapter spool of the present invention.

Returning to FIG. 7, once the adapter spool 10 is assembled, the peaks of the sealing ribs 38 come into contact with the mastic 72 wrapped around the central portion of the neoprene tape 70 which is wrapped around the cable 14. As the bolts are tightened further, a radial force builds between the peaks of the sealing ribs 38 located in the central portion 30, the top portion 32 and the bottom portion 34 of the adapter spool 10 and the mastic 72. Under this force, the mastic 72 flows laterally over the peaks of the sealing ribs 38 to fill the area formed between the individual sealing ribs 38 and the neoprene wrapped cable 14. The excess mastic 72 may flow into the mastic communication ports 84 (as shown in FIGS. 9 and 10 and discussed further below).

Also shown in FIG. 7 is the adapter spool sealing channel 80 which is provided circumferentially around the central portion 30, the top portion 32 and the bottom portion 34 of the adapter spool 10. Once the adapter spool 10 is assembled, the adapter spool sealing channel 80 provides a channel around the circumference of the adapter spool 10 which is periodically interrupted by a mastic communication port 84. A mastic rope 82 formed substantially of the same material as the mastic 72 described in accordance with FIGS. 4 and 5 above, is placed in the sealing channel so as to fill the sealing channel 80 and cover the mastic communication port 84.

FIG. 9 is a top view taken along line 9—9 of FIG. 7 which shows the interaction between the mastic 72 and the mastic rope 82 once the adapter spool has been assembled around an optical fiber cable 14 or a plug 16. As shown in FIGS. 9 and 10, the assembled adapter spool includes mastic communication ports 84 which are formed by gaps between the central portion 30, and the top portion 32 and the bottom portion 34 of the adapter spool 10 in the assembled adapter spool 10. These mastic communication ports 84 are provided to permit mastic 72 and mastic rope 82 to flow together to form a hermetic seal throughout the adapter spool 10.

As best shown in FIG. 9, a portion of the mastic 72 may also flow into the various mastic communication ports 84 to fill the interstitial space between the cable entrance ports 18 and fill the interstitial space between the cable entrance ports 18 and the adapter spool sealing channel 80 as further described below.

The end plate assembly 12 (as shown in FIGS. 1 and 2) is formed from two semicircular end plate portions 20 and 22 which, when assembled in a disk, include a central circular cut-out which serves as a cable entrance port for a large diameter electrically-conductive cable. The end plate portions 20 and 22 each include an inner flange 56, an outer flange 58 and an end plate sealing channel 60. The inner flange 56 and the outer flange 58 serve to retain the front and back of the adapter spool 10 when the end plate portions 20 and 22 are bolted together by end plate bolts 59.

As shown in FIG. 9, as the end plate portions 20 and 22 are bolted together around the assembled adapter spool 10, capturing the adapter spool 10, the end plate sealing channel 60 comes into contact with the mastic rope 82 in the adapter spool sealing channel 80. As the end plate bolts are tightened pressure is generated on the mastic rope 82 by the force of the end plate sealing channel 60 and the adapter spool sealing channel 80. The mastic rope 82 flows to fill the area between the end plate sealing channel 60 and the adapter spool sealing channel 80.

As further shown in FIG. 9, the mastic rope 82 may also flow into the mastic communication ports 84 between each cable entrance port and the adapter spool sealing channel 80. Therefore, as a result of assembling the prepared cables within the adapter spool 10 and assembling the adapter spool within the end plate assembly 12, the mastic communication ports 84 permit fluid communication between the mastic 72 surrounding the prepared cables in the cable entrance ports and the mastic rope 82 in the adapter spool sealing channel 80. This continuous flow of mastic material provides a hermetic seal which protects the interior of the closure from the harmful elements of the external environment.

As shown in FIG. 1, the end plate assembly 12, with adapter spool 10 and optical fiber cables 14 installed as described above, is then installed into one end of the splice closure 8.

In an alternate embodiment employing an end plate assembly having a smaller cable entrance port or ports and no adapter, a cable 14, may be prepared as described above in relation to FIGS. 3–5 and installed directly into the cable entrance port of end plate assembly 12 of the splice closure 8. In such applications, the cable 14 is wrapped with a neoprene tape 70, as described in accordance with FIGS. 3 and 4 until the diameter of the wrapped cable 14 is substantially equivalent to the diameter of the cable entrance port of the end plate assembly 12. A layer of mastic sealant 72 is applied over the outer layer of neoprene tape 70 of the wrapped cable 14, as described in accordance with FIGS. 4 and 5. The neoprene tape should be at least as wide as the distance between the end plate inner flange 56 and outer flange 58. The mastic 72 is of generally the same width as the end plate sealing channel 60 (as shown in FIG. 2).

In operation, a cable of a smaller diameter may be retained and sealed within a cable entrance port in an end plate having a larger diameter by wrapping the cable with a neoprene tape having a high coefficient of friction, and a narrow strip of adhesive backing, until the diameter of the neoprene tape is substantially equivalent to the diameter of the cable entrance port. A layer of mastic sealant is applied to a narrow strip around the center of the neoprene tape, and the prepared cable is placed in the end plate assembly 12. A hermetic seal is formed between the wrapped cable and the cable entrance port in the end plate assembly by liberally applying a mastic material to the cable entrance port of the two halves of the end plate and securing the two halves around the cable. As the end plate bolts are tightened, the mastic flows between the wrapped cable and the end plate to form a seal which protects the interior of the closure from the external environment. At the same time, the wrapped cable is restrained within the cable entrance port of the end plate by radial pressure on the neoprene tape 72 from both the inner flange 56 and the outer flange 58.

As shown in FIG. 1, the end plate assembly 12 includes one or more anchoring bracket assemblies 100. The number of anchoring bracket assemblies 100 corresponds directly to the number of optical fiber cables 14 installed in the adapter spool 10.

Figure 11:
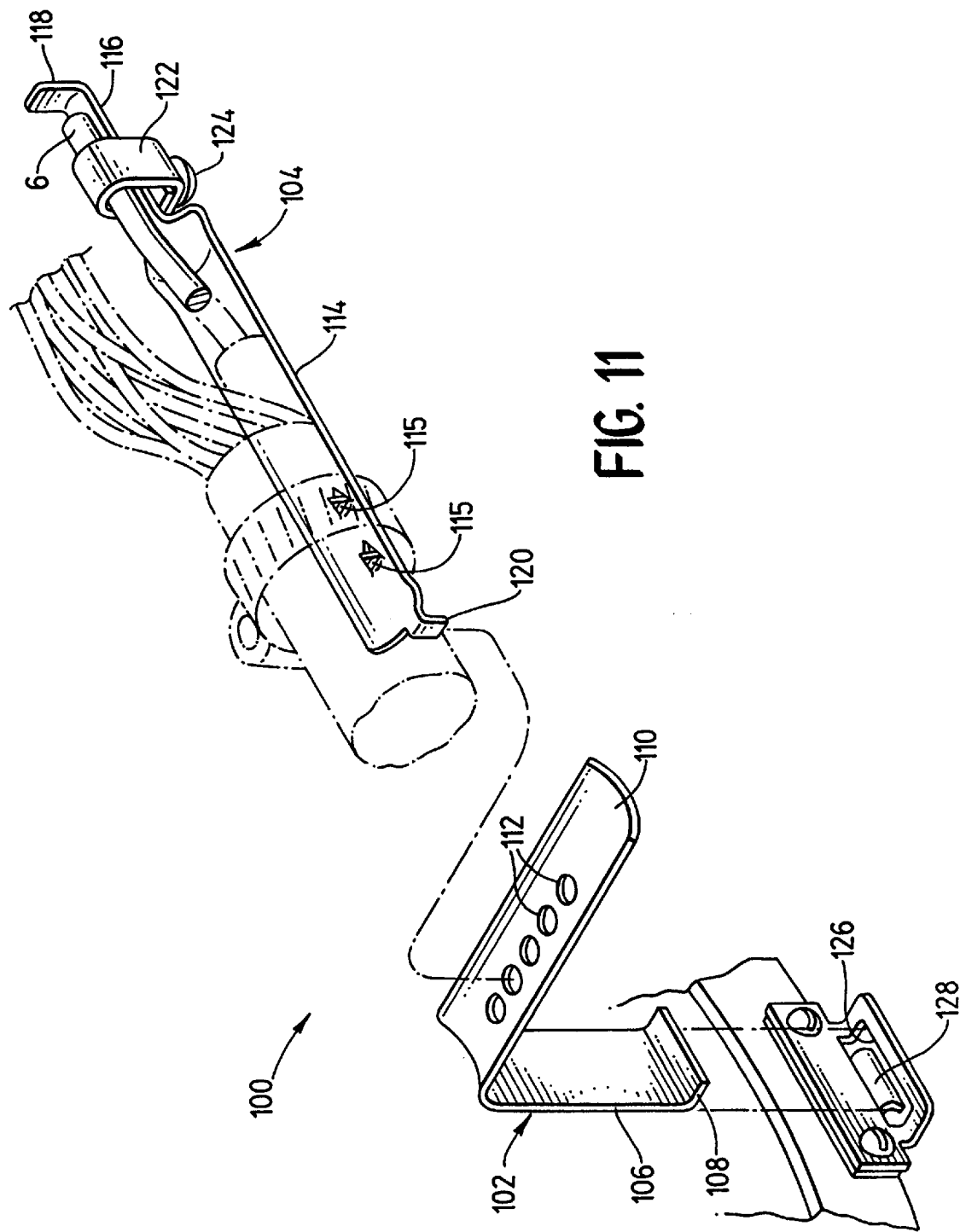
FIG. 11 is a top perspective view of the anchoring bracket assembly of the present invention.

As shown in FIG. 11, each anchoring bracket assembly 100 is preferably of two piece construction providing a bracing member 102 and a cantilevered member 104. In the alternative, the bracket may be integrally formed as a single unit. The bracing member 102 and the cantilevered member 104 are each formed from a high strength, rigid metal such as steel. The bracing member 102 is generally "U" shaped having central flat member 106, a base leg 108 which is shorter than the central member and provided with a flat surface at a substantially right angle to the central member 106, and a bracing leg 110 which is longer than the base leg 108 and provided with a concave surface at a substantially right angle to the central member 106 and substantially parallel to the base leg 108. The bracing leg 110 includes a series of holes 112 centrally located along the concave surface.

The cantilevered member 104 begins with a pin 120 which projects radially outward along a longitudinal axis of the cantilevered member 104. Integrally formed with the pin 120 is a concave portion 114 which extends laterally, transitions to a narrower, convex anchoring platform 116 and concludes in a retaining wall 118 which projects radially outward along a longitudinal axis in an opposing direction from that of the pin 120. The concave portion 114 includes sheath retainers 115, provided as two shallow, raised hooks which are integrally formed with the concave portion 114 of the cantilevered member 104 and which serve to assist in restraining the cable sheath 2 when an axial load is placed on the cable sheath 2.

The anchoring platform 116 provides a base for securing the strength member 6 of the cable 14. The secured to the 6 may be secured to the anchoring platform 116 with a strength member retainer which may be provided as a generally oblong collar 122 and associated anchor bolt 124. One end of the oblong collar 122 has a threaded hole for retaining the anchor bolt 124. The anchor bolt 124 may be provided with a substantially narrow, non-headed end to permit the non-headed end of the anchor bolt to be firmly retained by the concave underside of the anchoring platform 116 once the anchor bolt 124 is secured.

The diameter of the collar 122 is wide enough to capture both the strength member 6 and the anchoring platform 116.

Once the strength member 6 is captured within the collar, the anchor bolt 124 is tightened, retaining the strength member 6 between the collar 122 and the anchoring platform 116.

Once each strength member 6 has been anchored to a cantilevered member 104, and each corresponding cable 14 has been prepared for installation into the adapter spool 10, as described above, the cable or cables may be secured in the adapter spool 10. At the same time, as shown in FIGS. 12 and 13, the bracing member 102 may be secured to the inner flange 56 of the end plate assembly 12 via bracing slot 126. Bracing slot 126 is spring loaded by spring member 128 which is disposed between bracing slot 126 and the inner flange 56. The spring member 128 may be formed from spring steel or similar material having a memory which causes the spring member 128 to return to its original form. The bracing slot 126 and spring member 128 are secured to the inner flange 56 of the end plate assembly with conventional means such as screws. When the bracing member 102 is guided into bracing slot 126 the central member 106 is maintained parallel to the inner flange 56 by the spring member 128 by the constant pressure generated by the spring member 128.

Once each cable is secured within the adapter spool 10, the adapter spool may be secured within the end plate assembly 12 and, in turn, the sheath retention and strength member anchoring may be completed as shown in FIGS. 11–13 and as described as follows. The bracing member 102 is secured to the inner flange 56 of the end plate assembly 12 and maintained in place with spring member 128. The cantilevered member 104 is form fit to secure to the bracing leg 110 of the bracing member 102 as follows. The cantilevered member 104 is laid in place on top of the bracing leg 110 so that one concave surface lies above the other. The technician may then align the cantilevered member 104 laterally until the radially extending pin 120 of the cantilevered member 104 is secured within a corresponding hole 112 in the bracing leg 110. Once the cantilevered member 104 is snapped into place on the bracing member 102 a hose clamp 130 is provided which encircles the cable 14, the bracing leg 110 of the bracing member 102, and the cantilevered member 104 proximate the sheath retainers 115. The hose clamp 130 is tightened to complete the anchoring bracket assembly 100. As a result, retention of the cable sheath is assisted and the strength member 6 is anchored by the anchoring bracket assembly 100.

Figure 14:
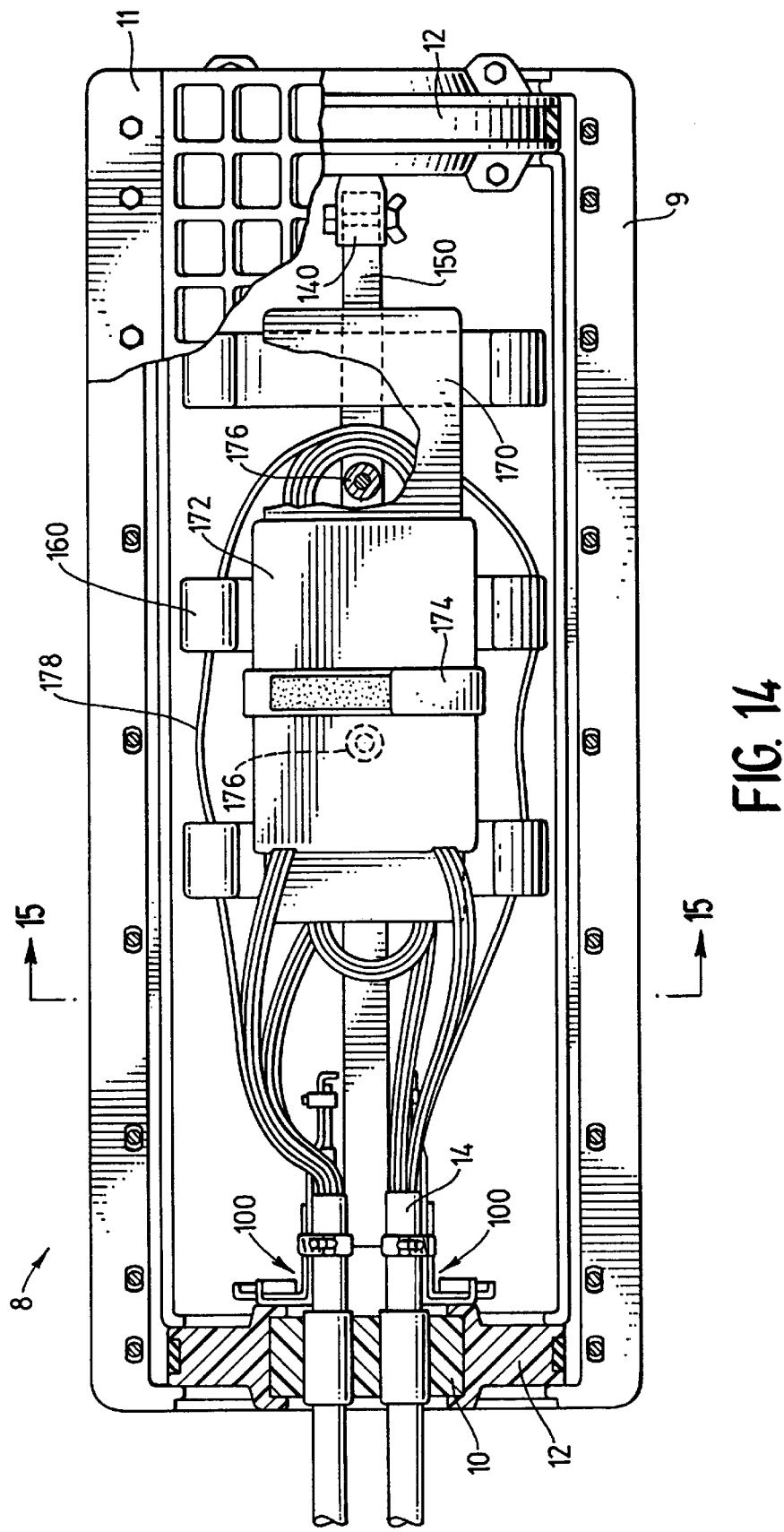
FIG. 14 is a top plan view of a preferred embodiment of the fiber optic cable splice closure of the present invention.
Figure 15:
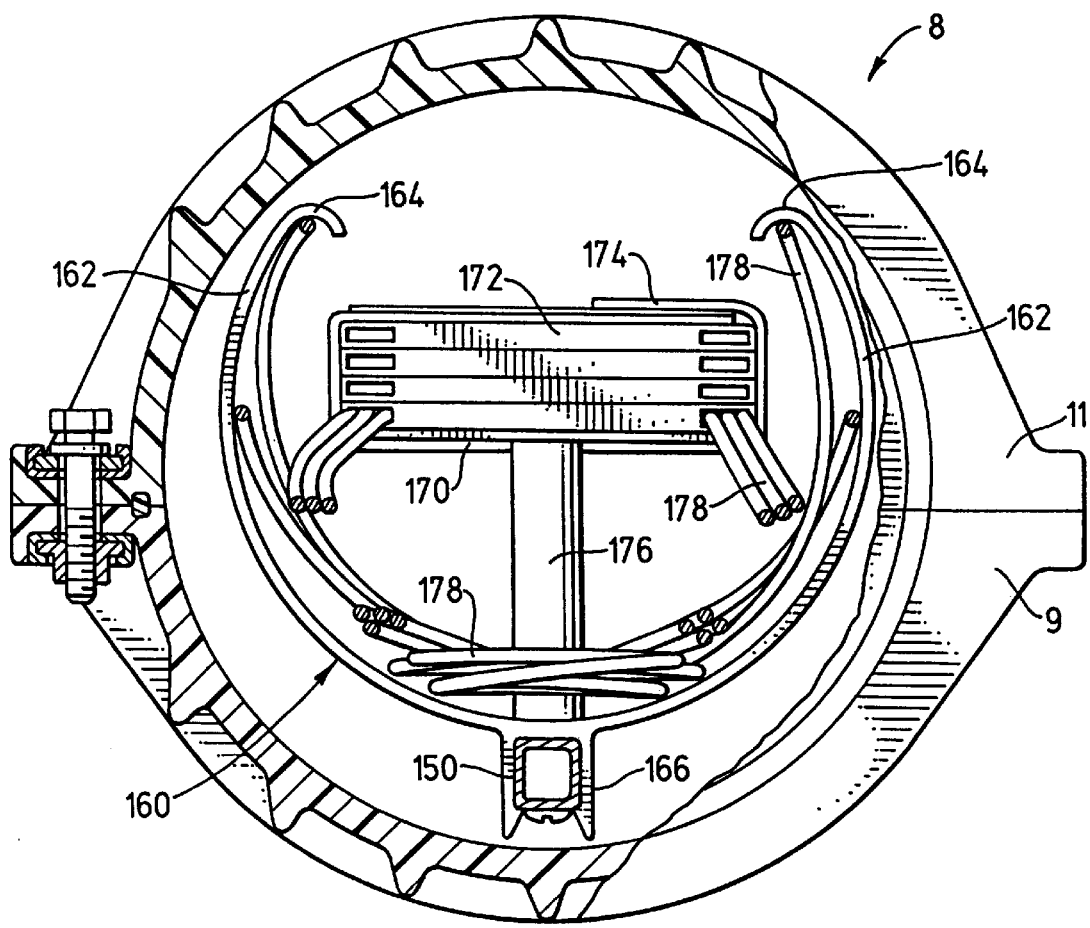
FIG. 15 is a side view taken along line 15—15 of FIG. 14 showing a cross-section of the fiber optic cable splice closure of present invention which illustrates how the buffer tubes are restrained by the buffer tube guides.

As shown in FIGS. 14 and 15, the closure of the present invention includes a mounting sleeve 140, a mounting bar 150, a buffer tube guide 160 and a fiber optic splice tray platform 170.

The mounting bar 150 is secured to each end plate with a mounting sleeve 140. The mounting bar has a generally square cross section and extends longitudinally to reach a length almost equivalent to that of the interior length of the closure 8. The mounting bar 150 is shorter than the interior length of the closure so it may be mounted within the closure to each end plate 12. The mounting bar may be formed of any rigid, strong metal such as steel, hard plastic or other material having the same properties. The mounting bar 150 is used to mount the fiber optic splice tray platform 170 and the buffer tube guides 160.

The fiber optic splice tray platform 170 provides a base upon which fiber optic splice trays 172 may be secured. Typically, fiber optic splice trays 172 are secured to the fiber optic splice tray platform 170 with a conventional fastener such as a fabric hook-and-eye fastener 174 as shown in FIGS. 14 and 15. In the alternative, the fiber optic splice trays may be bolted directly to the fiber optic splice tray platform 170.

The fiber optic splice tray platform 170 is secured to the mounting bar 150 using two or more spacers 176. Each spacer 176 may be provided as hollow metal or rigid plastic tubes having a diameter equivalent to that of the mounting bar 150 which bolt to the mounting bar 150 on one end and to the fiber optic splice tray platform 170 on the other end. The width of the spacers 176 combined with their rigidity provide sufficient platform 170 stability and strength. Typically, two or more spacers may be used. A sufficient distance is provided between the platform 170 and the mounting bar 150 by the spacers 176, to permit storage of excess lengths of fiber optic cable buffer tubes 178 between the platform and the mounting bar as will be described further below.

The buffer tube guides 160 are provided as a pair of integrally formed generally circular arms 162 which, together, form approximately ¾ of a circle. The buffer tube guide is formed of a durable plastic which may be less rigid than the plastic forming the closure so as to permit the arms to flex and bend, while retaining the buffer tubes, when the closure is being closed. The arms are formed to the shape and size of the interior circumference of the closure 8. Each arm 162 concludes in an integrally formed hooked element 164. The hooked element 164 of the buffer tube guide 160 acts to retain loose buffer tubes between the buffer tubes guides and the platform 170 so as to prevent a loose buffer tube from interfering with the sealing of the closure 8. Consequently, the buffer tube guides 160 ensure a proper closure seal as well ensure the buffer tubes, and the optical fibers contained therein, are not damaged during closure installation and maintenance.

The base of the buffer tube guide 160 includes a guide clip 166 integrally formed with the buffer tube guide 160. The guide clip is adapted to be removably secured to the mounting bar 150. The guide clip 166 includes two lateral surfaces which conclude in overlapping edges which retain the mounting bar 150. In the alternative, the buffer tube guide may be mounted directly to the mounting bar with conventional fasteners or may be integrally formed with the mounting bar during manufacture. In operation, the buffer tube guide 160 may be aligned with the mounting bar 150 and pushed over the mounting bar 150 until the overlapping edges snap in place over the base of the mounting bar 150.

Each end of the mounting bar 150 is secured to an end plate 12 with a mounting sleeve 140. One end of the mounting sleeve 140 is adapted to receive the mounting bar 150 and the other end is provided with a mounting bracket 142 (as shown in FIG. 1) which may be secured to the end plate proximate the bottom of the closure base 9 using conventional fasteners such as self-threading screws. In the alternative, the mounting bracket 142 and consequently the mounting sleeve 140 may be integrally formed with the end plate 12. In yet another alternative guide holes may be drilled into the end plate to which the mounting bracket 142 may be fixed by screws.

The end of the mounting sleeve adapted to receive the mounting bar is formed in the same general shape as the mounting bar 150 and has a hollow portion sized to retain one end of the mounting bar 150. The mounting bar 150 and the mounting sleeve 140 are each provided with through holes which are used to secure the mounting bar to the mounting sleeve. In the alternative, the mounting bar and sleeve may be integrally formed and installed as a single structure into the end plates 12.

In practice, the mounting bar 150 is aligned with the mounting sleeve 140 by the technician who slides the mounting bar inside the mounting sleeve until the through holes are in alignment. Once aligned, the technician inserts a bolt and secures the bolt with a nut such as a butterfly nut or equivalent. Each end of the mounting bar 150 is secured to an end plate 12 through a mounting sleeve 140.

The optical fiber cable closure in accordance with a preferred embodiment of the present invention includes a plurality of closure stabilizer lugs 180 as shown in FIG. 1. The closure stabilizer lug 180 is a cylindrical post having an integrally formed threaded end. The closure stabilizer lug 180 may be formed of any rigid, strong plastic or metal having similar properties. The threaded end is formed to fit the through-holes 13 in the closure base 9 and/or closure cover 11. The stabilizer lugs 180 are sized to support the closure base 9, for example, during installation or maintenance operations. Typically, a closure having rounded sides is an unsuitable platform for splicing cables due to its inherent latitudinal instability. Installing one or two stabilizer lugs 180 in each side of the closure base 9 provides greatly increased stability during installation and maintenance operations. Once operations are concluded, each lug 180 is unscrewed so that the closure cover 11 may be put in place and all closure bolts may be installed using the through-holes 13.

In view of the foregoing structural description of the fiber optic cable splice adapter closure of the present invention, its functional features may be readily appreciated in consideration with FIGS. 1 and 14.

In making a splice into a fiber optic cable 14, the cable sheath and strength member must be secured within a closure assembly 8 and excess lengths of buffer tubes must be safely retained within the closure 8. A 2-type closure, as defined above, is provided with a base, a cover, an end plate for each end, and an integrally formed bracing slot and spring member secured to the inside of each end plate for securing the electrically-conductive cable. Each end plate assembly 12 is provided with a cable entrance port which is adapted to receive an adapter spool 10 or is sealed against the environment with an end plate assembly plug. In an in-line splice closure application it will be appreciated that each end plate assembly is outfitted with an adapter spool 10. In a butt-splice closure application, as shown in FIG. 1, it will be appreciated that only one of the end plate assemblies will be provided with an adapter spool 10 and the other end plate assembly will be sealed against the environment with an end plate assembly plug.

The optical fiber cable splice closure may be adapted from a standard 2-type closure using an adapter spool and an adapter assembly. The adapter assembly preferably includes anchoring bracket assembly 100, mounting sleeve 140, mounting bar 150, buffer tube guide 160, and a fiber optic splice tray platform 170. Closure stabilizing lug 180 may also be employed.

Stabilizer lugs 180 may be inserted into the through-holes 13 of the base 9 to stabilize the closure base for cable splicing operations. The stabilizer lugs limit rocking in the closure base while the installer is adapting the closure for optical fiber use. A mounting sleeve 140 is attached to each end plate aligned with a location proximate the bottom of the closure base 9. Each end of a mounting bar 150, having thereon assembled a fiber optic splice tray platform 170 and spacers 176, is inserted into either mounting sleeve. Generally, if only a butt-splice is desired, the fiber optic splice tray platform 170 may be biased towards the end of the closure away from the cable entrance ports to be used, in order to provide the installer maximum clearance. The ends of the mounting bar 150 are secured to the mounting sleeves 140 using fasteners such as a wing nut for ease of manipulation.

The buffer tube guides 160 are secured to the mounting bar 150. Each buffer tube guide 160 is manipulated and the guide clip 166 is snapped into place as desired. Generally, it is desirable to have two or more buffer tube guides to adequately restrain most of the buffer tubes 178 between the buffer tube guides 169 and the optical fiber splice tray platform 170. In the event that an excess length of buffer tube drifts above the optical fiber splice tray platform 170, the hooked element 164 will retain the tube to keep it from interfering with opening or closing of the closure.

Once assembled, the assembly may be placed into the end plate retainers of the closure base 9. The cable is prepared for splicing by cutting open the cable sheath 2 and separating the buffer tubes 178 containing the optical fibers 4. The strength member 6 is anchored to a cantilevered member 104 by securing the strength member 6 to the anchoring platform 116 integrally formed with the cantilevered member 104. This may be performed before the cable is secured within the adapter spool because the anchoring bracket assembly is comprised of two parts. Therefore, the cantilevered member 104 may be secured to the strength member 6 before placing the cable in the closure. This provides more freedom of movement to permit the installer to secure the strength member quickly and efficiently.

Once the strength member is secured, the cable may be prepared with tape and mastic for insertion into the adapter spool 10. Once the cable has been installed in the adapter spool 10 and the adapter spool 10 is secured within the end plate 12, the anchoring assembly may be completed. The bracing member 102 is secured to the inner flange 56 of the end plate assembly 12 and maintained in place with spring member 128. The cantilevered member 104, secured to the strength member 6, is aligned with the bracing member 102 laterally until the radially extending pin 120 of the cantilevered member 104 is secured by a corresponding hole 112 in the bracing leg 110 of the bracing member. A hose clamp 130 is provided to encircle the cable 14, the bracing leg 110 of the bracing member 102, and the cantilevered member 104 proximate the sheath retainers 115. The hose clamp 130 is tightened to complete the anchoring bracket assembly 100. As a result, retention of the cable sheath is assisted by the clamp and sheath retainers 115 and the strength member 6 is anchored by the anchoring bracket assembly 100.

Retention of the optical fiber cable sheath 2 may be enhanced over and above the optical fiber cable sheath 2 retention provided by the adapter spool 10 by the hose clamp 130. Additional sheath retention is provided by the sheath retainers 115 integrally formed with the cantilevered member 104 which bite into a portion of the cable sheath as the hose clamp is tightened. The hose clamp 130 is tightened around the optical fiber cable 14 and the cantilevered member 104 and the bracing member 102 until sufficient radial force is applied to the optical fiber cable sheath 2 to assist in preventing cable sheath pull-out due to axial loads on the optical fiber cable sheath 2 generated by changing external temperature, for example. The adapter spool 10 provides adequate cable sheath retention in and of itself. However, the sheath retainers 115 and the hose clamp 130 provide additional cable sheath retention for little additional cost. In addition, because the adapter spool 10 provides adequate retention of the cable sheath 2, the hose clamp 130 is not required to be closed as tightly as is required for electrically-conductive cable, therefore limiting undue radial force on the optical fibers within the optical fiber cable 14. Instead, additional cable sheath retention is provided with minimal risk of interfering with efficient optical signal transmission.

Once the cable is secured and sealed within the adapter spool 10 and end plate 12, excess lengths of the buffer tubes 178 are looped and laid within the base 9 of the closure around the spacers 176 between the buffer tube guides 160 and the fiber optic splice tray platform 170. Each buffer tube containing optical fibers to be spliced is routed to a fiber optic splice tray 172. The buffer tube is secured within the fiber optic splice tray 172 and the optical fibers within are exposed for splicing.

After the optical fibers have been spliced as required, each fiber optic splice tray is closed and the trays are stacked on the fiber optic splice tray platform 170. The trays may be secured to the platform 170 by a bolt or by wrapping the trays, along with the platform 170, with a length of a hook-and-eye type commercial fabric fastener to secure the trays to the platform 170.

The closure is sealed using closure cover 11. The stabilizing lugs 180 are removed from the through-holes 13 and the closure cover 11 is bolted to the closure base 9.

In order to easily adapt a standard electrically-conductive cable closure, such as a 2-type closure, to serve as an optical fiber splice cable closure, the present invention further provides an adapter kit. As such, the adapter kit may be used to modify any closure having a base, cover and end plates, or in the case of a dome-type closure as will be described further below, an end plate and a dome cover.

The adapter kit of the present invention provides the necessary parts to convert a 2-type closure into a fiber optic splice closure. A 2-type closure is provided with a base, a cover, an end plate for each end, and an integrally formed bracing slot and spring member secured to the inside of each end plate for securing the electrically-conductive cable as described above. The adapter kit includes an adapter spool and an adapter assembly.

The adapter spool includes (as shown in FIG. 10) a central portion 30, a top portion 32 and a bottom portion 34. The adapter spool is bolted together with bolts 40, washers 46 and nuts 48, also provided. The kit includes neoprene tape and mastic for wrapping the cable and sealing the cable within the adapter spool 10.

The adapter assembly provided in the kit preferably includes a plurality of anchoring bracket assemblies 100, two mounting sleeves 140, a mounting bar 150, two buffer tube guides 160, a fiber optic splice tray platform 170 secured to the mounting bar 150 with spacers 176, and closure stabilizing lugs 180. The bracket assembly includes a bracing member 102, a cantilevered member 104 having an anchoring platform, and a hose clamp 130.

The kit may include additional anchoring bracket assemblies 100, buffer tube guides 160 and additional accessories for installing cables, such as a cable wrapping guide and spare fasteners as needed for different adapter spool and closure configurations.

In operation, the present invention provides a method for adapting a closure for use with optical fiber cables by installing the adapter kit of the present invention into the closure. To modify an existing closure, stabilizer lugs 180 may be inserted into the through-holes 13 of the base 9 to stabilize the closure base for cable splicing operations. A mounting sleeve 140 is attached to each end plate aligned with a location proximate the bottom of the closure base 9. Each end of a mounting bar 150, having thereon assembled a fiber optic splice tray platform 170 and spacers 176, is inserted into either mounting sleeve and secured to the mounting sleeves 140 as described above. The buffer tube guides 160 are secured to the mounting bar 150.

Once assembled, the adapter assembly may be placed into the end plate retainers of the closure base 9. The cable is prepared as described above. The strength member 6 is anchored to the cantilevered member 104 by securing the strength member 6 to the anchoring platform 116 integrally formed with the cantilevered member 104. The cable may then be prepared with tape and mastic for insertion into the adapter spool 10. Once the cable has been installed in the adapter spool 10 and the adapter spool 10 is secured within the end plate 12, the anchoring assembly may be completed. The bracing member 102 is secured to the inner flange 56 of the end plate assembly 12 and maintained in place with spring member 128. The cantilevered member 104, secured to the strength member 6, is aligned with the bracing member 102 laterally until the radially extending pin 120 of the cantilevered member 104 is secured by a corresponding hole 112 in the bracing leg 110 of the bracing member. A hose clamp 130 is provided to encircle the cable 14, the bracing leg 110 of the bracing member 102, and the cantilevered member 104 proximate the sheath retainers 115. The hose clamp 130 is tightened to complete the anchoring bracket assembly 100. As a result, retention of the cable sheath is assisted by the clamp and sheath retainers 115 and the strength member 6 is anchored by the anchoring bracket assembly 100.

After the buffer tubes have been properly retained and optical fibers have been spliced as required, each fiber optic splice tray is closed and the trays are stacked on the fiber optic splice tray platform 170. The trays may be secured to the platform 170 by a bolt or by wrapping the trays, along with the platform 170, with a length of a hook-and-eye type commercial fabric fastener to secure the trays to the platform 170. The closure is sealed using closure cover 11. The stabilizing lugs 180 are removed from the through-holes 13 and the closure cover 11 is bolted to the closure base 9.

Accordingly, it will be appreciated that the fiber optic cable splice closure of the present invention provides an improved fiber optic cable splice closure for sealing fiber optic cable splices and effectively restraining the fiber optic cable sheath while effecting a minimum amount of radial force on the optical fibers and which provides a hermetic seal between the optical fiber cable and the cable entrance port. Furthermore, the fiber optic cable splice closure of the present invention provides an adapter to permit existing closures designed for use with large diameter electrically-conductive cables to be used with smaller and more bending sensitive fiber optic cables. Moreover, the fiber optic cable splice closure adapter kit of the present invention permits a standard electrically-conductive cable closure to be adapted to restrain and seal a fiber optic cable. Thus, a single closure may be maintained in inventory to service either fiber optic or electrically-conductive cables.

Providing a fiber optic cable splice closure which is based on an existing electrically-conductive cable closure design permits a telecommunications company which typically installs both optical fiber cable and electrically-conductive cable to maintain a single closure in inventory, along with the corresponding repair kits and specialized tooling, to satisfy both needs. Furthermore, all installation and maintenance technicians need only be trained to work with a single closure to properly install and maintain both types of closures.

The present invention also provides an integrally formed bracket which serves to both anchor the optical fiber cable strength member and provide additional strain relief on the optical fiber cable sheath to prevent cable sheath pull-out in an inexpensive and easy to install system.

While the foregoing description has been of a presently preferred embodiment of the fiber optic cable splice closure of the present invention, it should be appreciated that the fiber optic cable splice closure of the present invention may be modified in a wide variety of ways while still remaining within the spirit and scope of the present invention. For example, the specific configuration of the adapter spool cable entrance openings, the gripping teeth, the sealing ribs and the sealing channel may all be varied due to specific manufacturing considerations or other reasons without departing from the spirit and scope of the present invention. Additional configurations of buffer tube guides, such as a guides with longer or shorter arms or perhaps spacing guides closer or farther apart, may be provided to retain the buffer tubes within the specific closure selected.

Furthermore, while a 2-type closure has been described, the fiber optic cable splice closure of the present invention may be adapted from any electrically-conductive cable closure having a closure cover, a closure base and two end plates.

In another embodiment, a single end plate assembly may be used with a dome-type closure. A dome closure has an end plate assembly and a dome cover. In such an application, the end plate assembly is adapted to receive one or more fiber optic cables with an adapter spool. The dome closure may be adapted using an adapter spool and an adapter assembly. The end plate assembly is provided with an integrally formed bracing slot and spring member secured to the inside of the end plate assembly. The adapter assembly preferably includes an anchoring bracket assembly for each fiber optic cable to be retained within the closure, a mounting sleeve and mounting bar, one or more buffer tube guides, and a fiber optic splice tray platform.

A mounting sleeve is attached to the end plate assembly. A corresponding mounting sleeve is provided in the base of the dome. The mounting bar, having thereon assembled a fiber optic splice tray platform and spacers, is inserted into the mounting sleeve attached to the end plate assembly and the buffer tube guides are secured to the mounting bar. Generally, it is desirable to have two or more buffer tube guides to adequately restrain most of the buffer tubes between the buffer tube guides and the optical fiber splice tray platform.

The optical fiber cable is prepared, anchored, and inserted into the adapter spool as described above in association with the discussion of the 2-type closure. Once the cable has been installed in the adapter spool and the adapter spool is secured within the end plate, the anchoring assembly may be completed as described above. The completed assembly may be inserted into the dome closure such that the other end of the mounting bar is retained in the dome closure. The dome closure is then sealed.

The present invention may be used with a wide variety of splice trays typically used to splice optical fibers as long as the tray fits within the closure selected and may be secured to the tray by means such as a hook-and-eye fastener. Finally, although the fiber optic cable splice closure has been described for use with fiber optic cable, the fiber optic splice closure is suitable for adapting any type of cable, including electrically-conductive cable, to be restrained and sealed within a cable entrance port.

Additional variations and modifications of the preferred embodiment described above may also be made as will be appreciated by those skilled in the art and accordingly the above description of the present invention is only illustrative in nature. The invention is further defined by the following claims.

What is claimed is:

1. A splice closure assembly adapted for enclosing an optical fiber cable splice, which cable includes an optical fiber cable sheath, a strength member, and a plurality of optical fibers, the splice closure assembly comprising:

two end plate assemblies, at least one of which has an opening of a first diameter therein;

a closure base and a closure cover attached to said end plate assemblies;

an adapter spool secured within said opening in said end plate assembly, said adapter spool having an outer diameter matching said first diameter and having a cable entrance port having a second diameter for receiving the optical fiber cable therein;

said adapter spool further comprising:

means for contracting said outer diameter of said adapter spool to secure the optical fiber cable within said cable entrance port;

means for restraining the optical fiber cable sheath within the closure by applying radial force to the cable within said cable entrance port; and means for distributing said radial force to the optical fiber cable.

2. A splice closure assembly according to claim 1, wherein said means for distributing said radial force comprises a high coefficient of friction tape which is as wide as said means for restraining said optical fiber cable sheath, said tape having a strip of adhesive applied longitudinally along a central portion of one side of said tape for facilitating cable wrapping and for providing a seal between succeeding layers of said tape, wherein said tape is wrapped around the optical fiber cable until the diameter of said wrapped cable is equivalent to said second diameter.

3. A splice closure assembly according to claim 1, wherein said means for restraining comprises an annular flange having a plurality of gripping teeth which extend radially inward toward the center of said cable entrance port, wherein said annular flange is integrally formed with said adapter spool and said teeth are displaced in an arcuate configuration for retaining said means for distributing said radial force to the optical fiber cable when said means for contracting is actuated, thus retaining the fiber optic cable sheath against axial loads.

4. The splice closure assembly according to claim 3, wherein said means for restraining further comprises at least two said annular flanges.

5. The splice closure assembly according to claim 1, wherein said means for restraining comprises a raised rib which extends toward the center of said cable entrance port, wherein said raised rib is integrally formed with said adapter spool and is displaced in an arcuate configuration for retaining said means for distributing said radial force to the optical fiber cable when said means for contracting is actuated, thus retaining the fiber optic cable sheath against axial loads.

6. The splice closure assembly according to claim 5, wherein said means for restraining further comprises at least two raised ribs located proximate a front end and a back end of said adapter spool.

7. A method for adapting a cable to an end plate assembly having a cable entrance port of a first diameter, the cable having a third diameter and having a sheath, the method for adapting comprising the steps of:

providing tape having a high coefficient of friction and having a narrow strip of adhesive applied to one side;

applying said adhesive side of said tape around said cable to form a seal between the cable and the tape;

providing an adapter spool capable of being expanded and contracted, the contracted adapter spool having a first diameter and one or more adapter spool cable entrance ports having a second diameter;

wrapping said tape around the cable until the diameter of said wrapped cable is equivalent to said second diameter;

wrapping said wrapped cable with a layer of mastic sealant around a strip around the longitudinal center of the neoprene tape of the wrapped cable;

placing said wrapped cable into an adapter spool cable entrance port of an expanded adapter spool;

contracting said adapter spool to exert radial force on said wrapped cable, wherein said wrapped cable is sealed and restrained within said cable entrance port of said contracted adapter spool and wherein said contracted adapter spool has a first diameter.

8. A splice closure assembly for enclosing an optical fiber cable splice, which cable includes an optical fiber cable sheath, a strength member, and a plurality of optical fibers, the splice closure assembly comprising:

an end plate assembly having an opening of a first diameter therein;

a closure cover secured to said end plate assembly;

an adapter spool secured within said opening in said end plate assembly, said adapter spool having an outer diameter matching said first diameter and having a cable entrance port having a second diameter for receiving the optical fiber cable therein;

said adapter spool further comprising:

means for contracting said adapter spool;

an annular flange having a plurality of gripping teeth which extends radially inward toward the center of said cable entrance port, wherein said annular flange is integrally formed with said adapter spool and said teeth are displaced in an arcuate configuration; and a raised rib integrally formed with said adapter spool, wherein said rib extends toward the center of said cable entrance port and is displaced in an arcuate configuration.

9. A splice closure assembly according to claim 8, further comprising means for distributing radial force to the optical fiber cable.

10. A splice closure assembly according to claim 9, wherein said means for distributing said radial force comprises a high coefficient of friction tape which is as wide as said means for restraining said optical fiber cable sheath, said tape having a strip of adhesive applied longitudinally along a central portion of one side of said tape for facilitating cable wrapping and for providing a seal between succeeding layers of said tape, wherein said tape is wrapped around the optical fiber cable until the diameter of said wrapped cable is equivalent to said second diameter.

11. A splice closure assembly according to claim 10, wherein said annular flange and said rib are configured so as to retain said means for distributing radial force to the optical fiber cable when said means for contracting is actuated so as to retain the fiber optic cable sheath against axial loads.

12. A splice closure assembly according to claim 8, wherein when said means for contracting is actuated said annular flange and said rib operate to retain the optical fiber cable sheath against axial loads.

13. The splice closure assembly according to claim 8, further comprising at least two said annular flanges and at least two said raised ribs, wherein when said means for contracting is actuated said annular flanges and said ribs operate to retain the optical fiber cable sheath against axial loads.

* * * * *